US011922762B2

(12) United States Patent
Cleveland et al.

(10) Patent No.: US 11,922,762 B2
(45) Date of Patent: Mar. 5, 2024

(54) DIGITAL WALLET SYSTEMS AND METHODS WITH RESPONSIBLE GAMING

(71) Applicant: Aristocrat Technologies, Inc., Las Vegas, NV (US)

(72) Inventors: Christopher Cleveland, Clovis, CA (US); Ben Vineyard, IV, Las Vegas, NV (US); Kevin Rowley, Henderson, NV (US); Samarth Raman, Las Vegas, NV (US); Abhinav Kant, Delhi (IN); Michael Smith, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 163 days.

(21) Appl. No.: 17/491,528

(22) Filed: Sep. 30, 2021

(65) Prior Publication Data
US 2022/0148377 A1    May 12, 2022

Related U.S. Application Data

(60) Provisional application No. 63/242,990, filed on Sep. 10, 2021, provisional application No. 63/112,400, filed on Nov. 11, 2020.

(51) Int. Cl.
G07F 17/32 (2006.01)
G06Q 20/10 (2012.01)
G06Q 20/36 (2012.01)

(52) U.S. Cl.
CPC ....... *G07F 17/3237* (2013.01); *G06Q 20/108* (2013.01); *G06Q 20/36* (2013.01);
(Continued)

(58) Field of Classification Search
CPC ............ G07F 17/3237; G07F 17/3223; G07F 17/3239; G06Q 20/108; G06Q 20/36; G06Q 20/10; G06Q 20/326
See application file for complete search history.

(56) References Cited

U.S. PATENT DOCUMENTS 5,830,067 A   11/1998 Graves
5,967,895 A   10/1999 Kellen
(Continued)

OTHER PUBLICATIONS

Office Action (Non-Final Rejection) dated Jun. 24, 2022 for U.S. Appl. No. 17/491,200 (pp. 1-11).
(Continued)

*Primary Examiner* — Kevin Y Kim
(74) *Attorney, Agent, or Firm* — Armstrong Teasdale LLP

(57) ABSTRACT

A digital wallet computing system is described including at least one processor in communication with a memory storing instructions. The instructions cause the at least one processor to establish wireless connectivity between a mobile device and an electronic gaming device, the electronic gaming device including a device identifier, receive a funds transfer request from the mobile device, the funds transfer request identifying a funds transfer amount and an external player account, and identify an operator identity based on the device identifier. The instructions also cause the at least one processor to identify a player account, the player account associated with the operator, perform a first withdrawal transaction moving the funds transfer amount from the electronic gaming device to the player account, and in response to the first withdrawal transaction, automatically perform a second withdrawal transaction moving the funds transfer amount from the player account to the external player account.

20 Claims, 23 Drawing Sheets

(52) U.S. Cl.
CPC ..... *G06Q 20/3676* (2013.01); *G07F 17/3223* (2013.01); *G07F 17/3239* (2013.01)

(56) References Cited

U.S. PATENT DOCUMENTS

| | | |
|---|---|---|
| 6,183,362 B1 | 2/2001 | Boushy |
| 6,306,038 B1 | 10/2001 | Graves |
| 6,311,976 B1 | 11/2001 | Yoseloff |
| 6,988,946 B2 | 1/2006 | Michaelson |
| 7,066,815 B2 | 6/2006 | Walker |
| 7,128,652 B1 | 10/2006 | Lavoie |
| 7,524,244 B2 | 4/2009 | Walker |
| 7,588,495 B2 | 9/2009 | Walker |
| 7,727,071 B2 | 6/2010 | Giobbi |
| 7,785,183 B1 | 8/2010 | Stockham |
| 7,806,761 B2 | 10/2010 | Walker |
| 7,815,502 B2 | 10/2010 | Hardy |
| 8,475,257 B2 | 7/2013 | Bienvenue |
| 9,305,427 B2 | 4/2016 | Walker |
| 9,558,619 B2 | 1/2017 | Froy |
| 9,659,435 B2 | 5/2017 | Rogers |
| 9,659,459 B2 | 5/2017 | Phillips |
| 9,922,493 B2 | 3/2018 | Walker |
| 10,269,209 B2 | 4/2019 | Miltenberger |
| 10,726,670 B2 | 7/2020 | Price |
| 11,508,217 B2 | 11/2022 | Harris |
| 2001/0007815 A1 | 7/2001 | Philipsson |
| 2002/0094860 A1 | 7/2002 | Itkis |
| 2004/0053694 A1 | 3/2004 | Rowe |
| 2004/0082384 A1 | 4/2004 | Walker |
| 2004/0148251 A1 | 7/2004 | Kavoun |
| 2004/0248645 A1 | 12/2004 | Blackburn |
| 2005/0059467 A1 | 3/2005 | Saffari |
| 2005/0187014 A1 | 8/2005 | Saffari |
| 2005/0193209 A1 | 9/2005 | Saunders |
| 2005/0250569 A1 | 11/2005 | Kane |
| 2006/0154727 A1 | 7/2006 | Okuniewicz |
| 2006/0205477 A1 | 9/2006 | Fisk |
| 2006/0205481 A1 | 9/2006 | Dominelli |
| 2006/0247035 A1 | 11/2006 | Rowe |
| 2007/0060237 A1 | 3/2007 | Rowe |
| 2007/0202941 A1 | 8/2007 | Miltenberger |
| 2007/0298873 A1 | 12/2007 | Nguyen |
| 2008/0150678 A1* | 6/2008 | Giobbi .................. G08C 17/02 340/5.2 |
| 2009/0143128 A1 | 6/2009 | Cautley |
| 2010/0229108 A1 | 9/2010 | Gerson |
| 2011/0245943 A1 | 10/2011 | Agarwal |
| 2011/0287823 A1 | 11/2011 | Guinn |
| 2013/0130766 A1 | 5/2013 | Harris |
| 2014/0221071 A1 | 8/2014 | Calio |
| 2014/0256407 A1 | 9/2014 | Graf |
| 2014/0274277 A1 | 9/2014 | Cuddy |
| 2014/0357354 A1 | 12/2014 | Gura |
| 2015/0235507 A1 | 8/2015 | Newton |
| 2015/0302482 A1 | 10/2015 | Vagner |
| 2016/0335855 A1 | 11/2016 | Ishibashi |
| 2017/0270493 A1* | 9/2017 | Lugli ..................... G06Q 20/10 |
| 2019/0220853 A1* | 7/2019 | Srinivasan ............. G06Q 20/10 |
| 2020/0051377 A1 | 2/2020 | Montenegro |
| 2020/0099694 A1 | 3/2020 | Weiss |
| 2020/0226885 A1 | 7/2020 | Weaver |
| 2020/0402353 A1* | 12/2020 | Higgins .............. G07F 17/3209 |
| 2021/0134104 A1 | 5/2021 | Harris |
| 2021/0233351 A1* | 7/2021 | Meltzer .............. G06Q 20/0658 |
| 2022/0032168 A1 | 2/2022 | Gupta |
| 2022/0036692 A1 | 2/2022 | Gupta |
| 2022/0270434 A1 | 8/2022 | Welch |

OTHER PUBLICATIONS

Office Action (Non-Final Rejection) dated Dec. 8, 2022 for U.S. Appl. No. 17/443,738 (pp. 1-19).
Office Action (Non-Final Rejection) dated Dec. 12, 2022 for U.S. Appl. No. 17/443,745 (pp. 1-9).
Office Action (Notice of Allowance and Fees Due (PTOL-85)) dated Dec. 27, 2022 for U.S. Appl. No. 17/491,200 (pp. 1-13).
Office Action (Notice of Allowance and Fees Due (PTOL-85)) dated Jan. 19, 2023 for U.S. Appl. No. 17/491,200 (pp. 1-2).
Office Action (Non-Final Rejection) dated Feb. 21, 2023 for U.S. Appl. No. 17/491,291 (pp. 1-24).
Office Action (Non-Final Rejection) dated Mar. 15, 2023 for U.S. Appl. No. 17/491,523 (pp. 1-29).
Office Action (Final Rejection) dated Mar. 24, 2023 for U.S. Appl. No. 17/443,745 (pp. 1-11).
Office Action (Notice of Allowance and Fees Due (PTOL-85)) dated Apr. 13, 2023 for U.S. Appl. No. 17/491,200 (pp. 1-7).
Office Action (Final Rejection) dated Apr. 20, 2023 for U.S. Appl. No. 17/443,738 (pp. 1-13).
Notice of Allowance dated Apr. 13, 2023 for U.S. Appl. No. 17/491,200 (pp. 1-7).
Office Action (Notice of Allowance and Fees Due (PTOL-85)) dated Jun. 23, 2023 for U.S. Appl. No. 17/809,844 (pp. 1-9).
Office Action (Final Rejection) dated Jul. 27, 2023 for U.S. Appl. No. 17/491,291 (pp. 1-31).
Office Action (Non-Final Rejection) dated Jul. 28, 2023 for U.S. Appl. No. 17/443,745 (pp. 1-7).
Office Action (Non-Final Rejection) dated Sep. 7, 2023 for U.S. Appl. No. 17/443,738 (pp. 1-14).
Office Action (Final Rejection) dated Sep. 22, 2023 for U.S. Appl. No. 17/491,523 (pp. 1-37).
Office Action (Notice of Allowance and Fees Due (PTOL-85)) dated Oct. 24, 2023 for U.S. Appl. No. 17/443,745 (pp. 1-7).

* cited by examiner

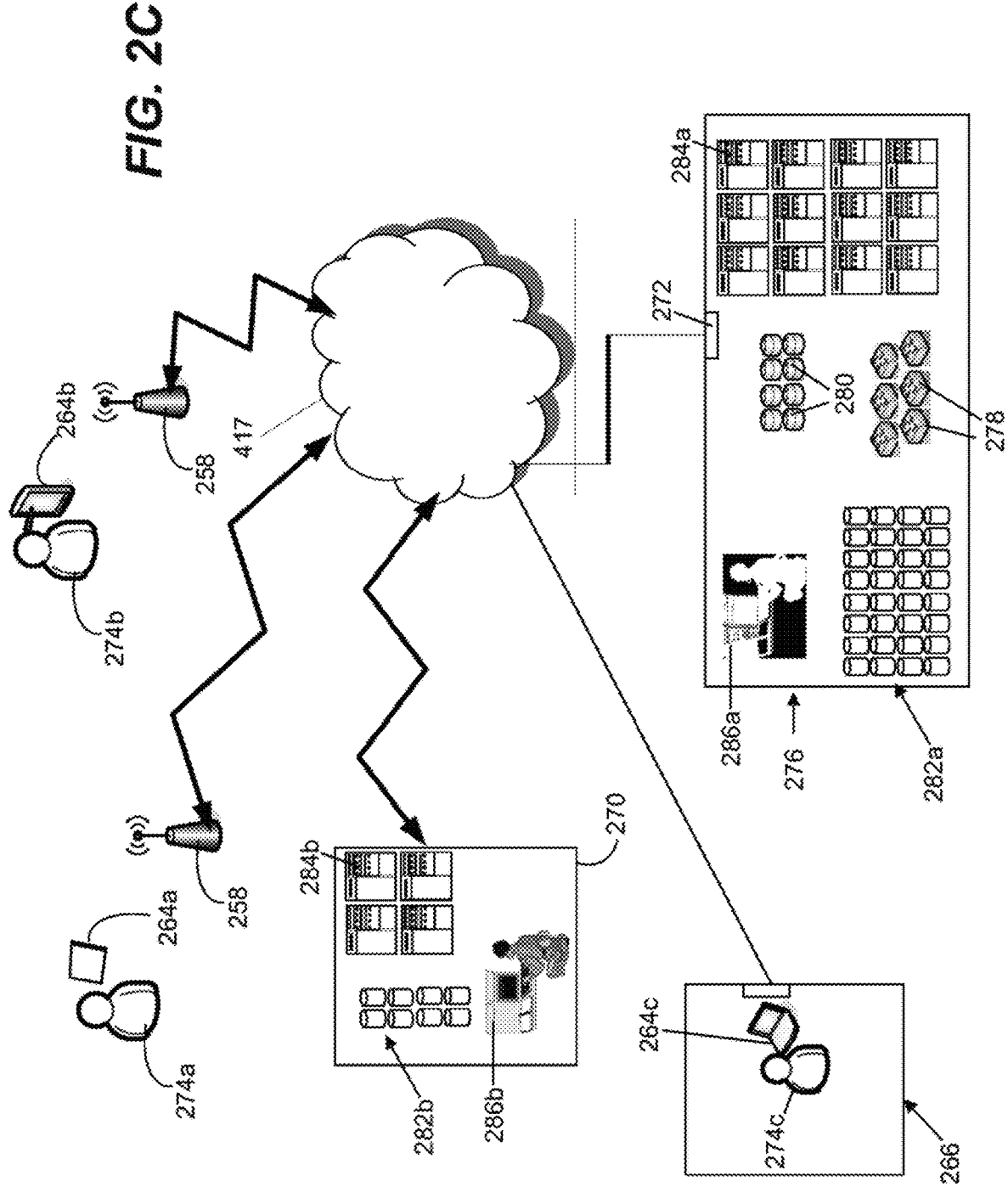

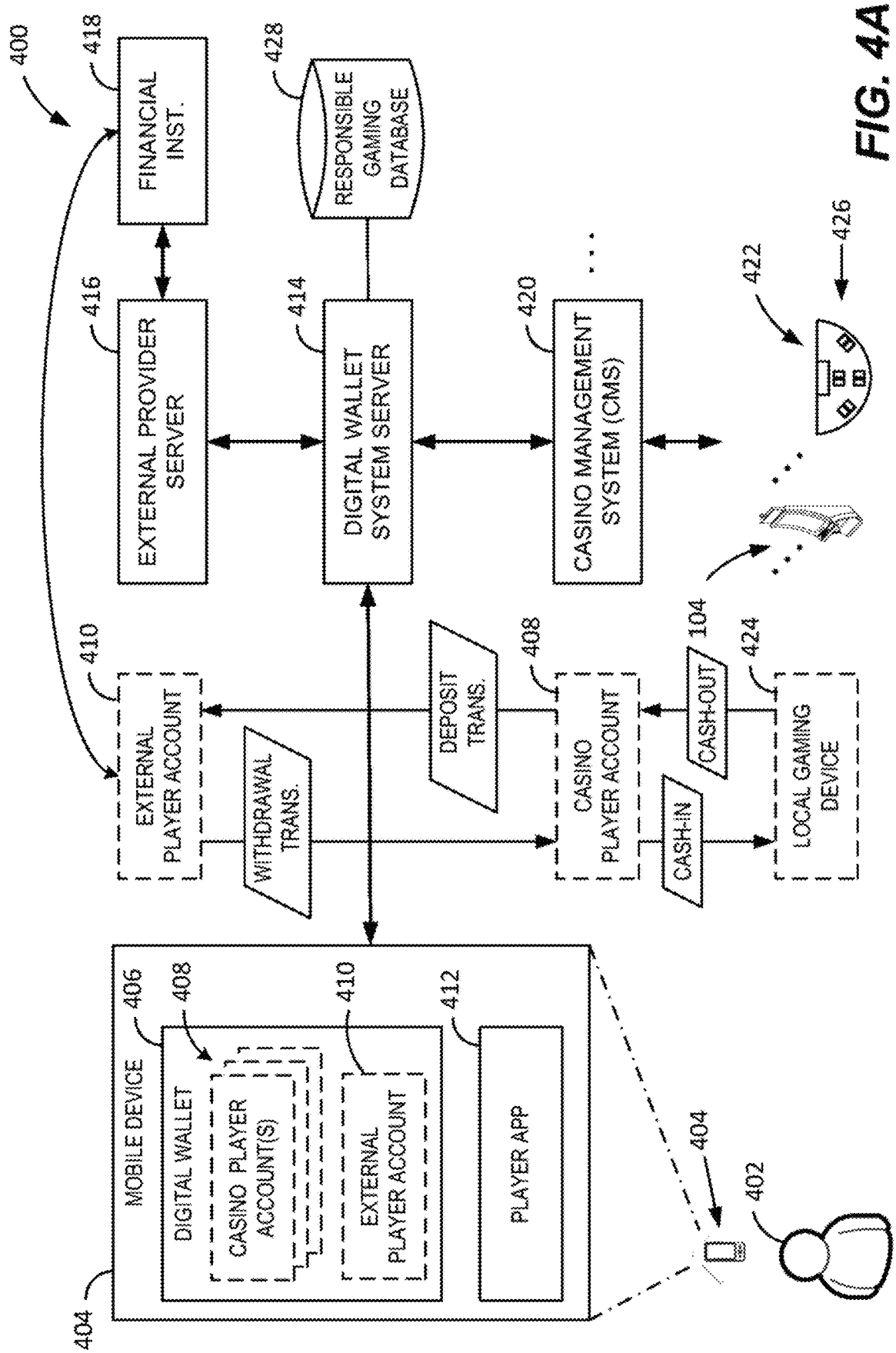

DIGITAL WALLET SYSTEMS AND METHODS WITH RESPONSIBLE GAMING

CROSS REFERENCE TO RELATED APPLICATIONS

The present application claims priority to U.S. Provisional Patent Application No. 63/112,400, filed Nov. 11, 2020, entitled "RANDOM BASED GAME OUTCOMES FOR REMOTE GAME PLAY" and U.S. Provisional Patent Application No. 63/242,990, filed Sep. 10, 2021, and entitled "DIGITAL WALLET SYSTEMS AND METHODS WITH RESPONSIBLE GAMING" which are hereby incorporated by reference in their entireties.

TECHNICAL FIELD

The field of disclosure relates generally to electronic gaming, and more particularly, to digital wallet systems and methods and responsible gaming with electronic games.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Certain venues may also include systems that provide additional functionality alongside EGMs. For example, player tracking systems offer a venue to track a player's play and provide additional rewards to players based on factors, such as the amount the player wagers or how frequently they wager. Player tracking systems can also provide support for a user to establish an account and transfer credits to the gaming machine and back to the player account. After a player enters a player tracking card, a player tracking device connected to or embedded within the EGM communicates with the player tracking system to obtain, manage, and/or track player information.

EGMs often depend on usability and player tracking information to enhance player experiences. Although previous EGMs and player tracking systems include various features that improve usability and enhance player experiences, there is a continuous need for further improvements to electronic gaming devices, gaming systems, and/or the overall gaming environment (e.g., land-based and digital gaming ecosystems) while complying with gaming regulations.

BRIEF DESCRIPTION

In one aspect, a digital wallet computing system is described. The digital wallet computing system includes at least one processor in communication with a memory device storing instructions. The instructions, when executed, cause the at least one processor to establish wireless connectivity between a mobile device of a player and an electronic gaming device, the electronic gaming device including a device identifier, receive an initiation of a funds transfer request from the mobile device of the player, the funds transfer request identifying a funds transfer amount and an external player account of the player, and identify an operator identity of an operator based on the device identifier of the electronic gaming device. The instructions also cause the at least one processor to identify a player account of the player, the player account associated with the operator, perform a first withdrawal transaction moving the funds transfer amount from the electronic gaming device to the player account associated with the operator, and in response to the first withdrawal transaction, automatically perform a second withdrawal transaction moving the funds transfer amount from the player account associated with the operator to the external player account of the player.

In another aspect, a computer-implemented method of providing digital wallet transactions implemented by a processor in communication with a memory device is described. The method includes establishing wireless connectivity between a mobile device of a player and an electronic gaming device, the electronic gaming device including a device identifier, receiving an initiation of a funds transfer request from the mobile device of the player, the funds transfer request identifying a funds transfer amount and an external player account of the player, and identifying an operator identity of an operator based on the device identifier of the electronic gaming device. The method also includes identifying a player account of the player, the player account associated with the operator, performing a first withdrawal transaction moving the funds transfer amount from the electronic gaming device to the player account associated with the operator, and in response to the first withdrawal transaction, automatically performing a second withdrawal transaction moving the funds transfer amount from the player account associated with the operator to the external player account of the player.

In another aspect, a non-transitory computer-readable medium storing instructions that, when executed by at least one processor, cause the at least one processor to establish wireless connectivity between a mobile device of a player and an electronic gaming device, the electronic gaming device including a device identifier, receive an initiation of a funds transfer request from the mobile device of the player, the funds transfer request identifying a funds transfer amount and an external player account of the player, and identify an operator identity of an operator based on the device identifier of the electronic gaming device. The instructions also cause the at least one processor to identify a player account of the player, the player account associated with the operator, perform a first withdrawal transaction moving the funds transfer amount from the electronic gaming device to the player account associated with the operator, and in response to the first withdrawal transaction, automatically perform a second withdrawal transaction moving the funds transfer amount from the player account associated with the operator to the external player account of the player.

BRIEF DESCRIPTION OF THE DRAWINGS

While certain implementations will be described in connection with the illustrative implementations shown herein, this disclosure is not limited to those implementations. On the contrary, all alternatives, modifications, and equivalents are included within the spirting and scope of the invention as defined by the claims. In the drawings, which are not to scale, the same reference numerals are used throughout the description and in the drawing figures for components and elements having the same structure. If applicable, primed reference numerals are used for components and elements having similar function and construction to those components and elements having the same unprimed reference numerals.

FIG. 2C is a diagram that shows examples of components of a system for providing online gaming according to some aspects of the present disclosure.

FIG. 4A is an architecture diagram illustrating components of an example digital wallet system.

DETAILED DESCRIPTION

Figure 1:
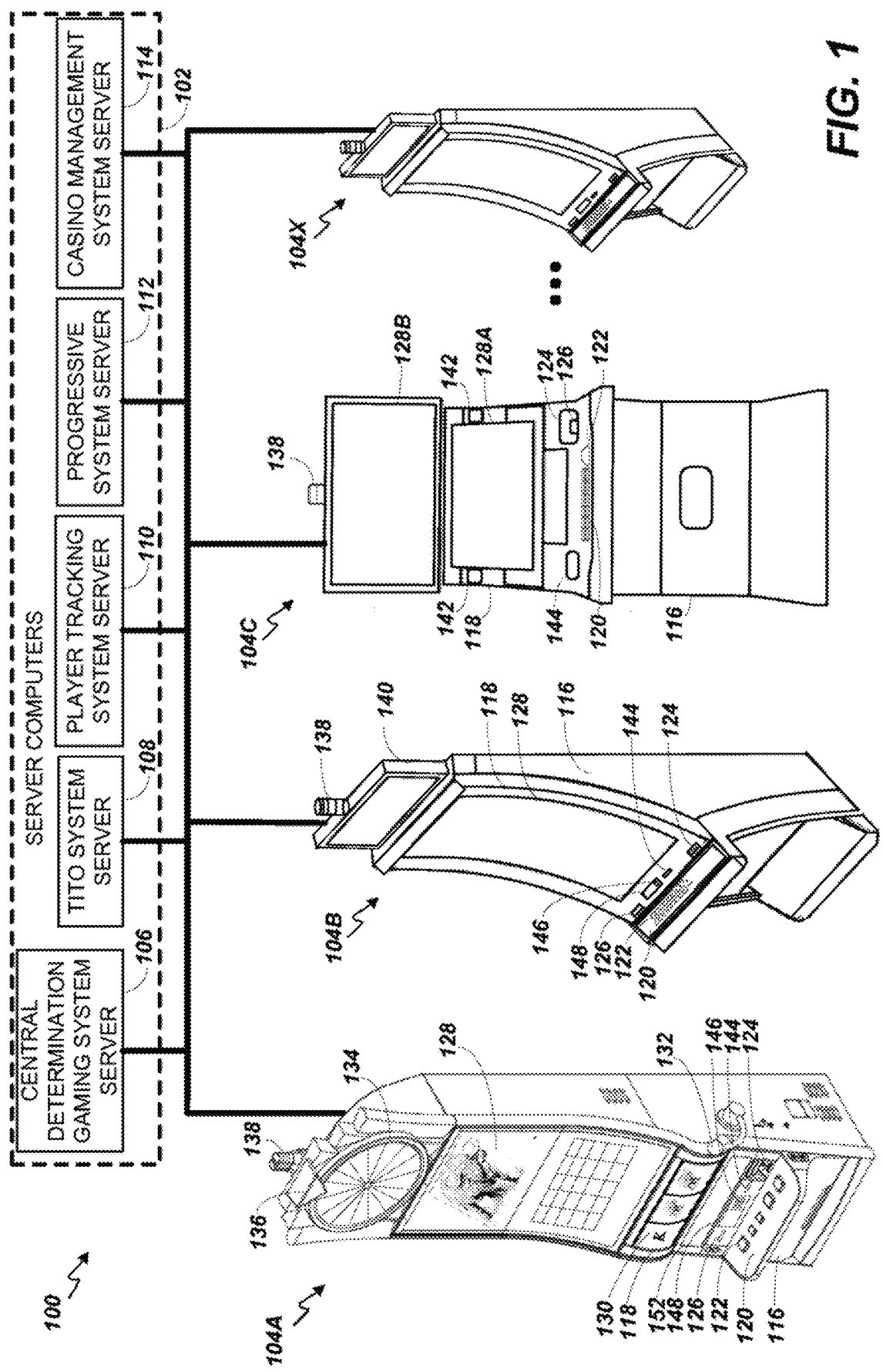
FIG. 1 is an exemplary diagram showing several EGMs networked with various gaming related servers.

In markets where casino enterprise properties are often within proximity of each other, conventional wallet architecture requires casino player account cash balances to remain at each casino site. If that same player has a balance at one casino location and travels to another casino site, the player will have to first log back into the first casino site to transfer money to an external provider. After that transfer, the player would need to transfer the balance into a player account associated with the new property that the player wants to fund gameplay. This disparate separation of play funds between various casino accounts of the player can cause frustration and confusion on the part of players, as many may not understand where their play funds reside as they move between properties or the necessity to manually initiate wallet transactions to migrate play funds to another casino account before use. Thus, there is a need to allow for a more seamless user experience where the patron's wallet balance is easily accessible and usable across multiple properties.

The present disclosure provides an improved digital wallet system and architecture that allows for the capability of automatic transfer of funds between casino player accounts and an external provider. Specifically, the improved digital wallet architecture pertains to utilizing a core enterprise application programming interface (EAPI) and wallet EAPI that allows a centralized wallet to automatically conduct transfers to and from casino accounts and external accounts of a player. The improved digital wallet architecture also includes a responsible gaming feature that allows a player (e.g., and/or game provider, gaming property) to set responsible gaming limits/thresholds and enforce those limits across multiple properties. The responsible gaming limits can be manually setup by the user or automatically created or modified based on historical player data. For example, a transfer limit could be based on historical game play and/or specific dates, days of the week, or the like, based on historical game play data of the player and/or other players.

Aspects of the present disclosure are technically rooted in game funding technology that allows players to automatically transfer funds between different casino sites (e.g., "gaming properties") while complying with gaming regulations. In prior digital wallet implementations, when a "cash out event" occurs during a carded gaming session, the funds managed or stored on the gaming device (e.g., tracked by the credit meter) may be sent to a casino player account for the known player. The player would then need to manually transfer funds from the casino player account to an external provider account (e.g., Everi/Sightline account). Rather than the player manually transferring funds from the casino player account to the external provider, the centralized digital wallet automatically transfers funds from the casino player account to the external provider without any player input and while satisfying gaming regulations. Similarly, a similar process may occur for a "buy in event" (e.g., card-in process, initial deposit transaction to the gaming device, or the like), automatically initiating a transaction of funds from the player's external provider account to casino player account before transferring those funds from the casino player account to the gaming device (e.g., EGM, table game, kiosk, or the like). In some embodiments, the automatic cash out and/or buy in events may be automatically performed by the digital wallet systems described herein when the player (e.g., a mobile device associated with the player) is detected as entering and/or exiting a gaming property.

Since the digital wallet system manages transactions involving both the external provider account(s) of the player and the various casino player accounts of various gaming properties for the player, enforcement of responsible gaming limits may be centrally managed and enforced. For example, in conventional systems, if $1,000 is set as a daily limit, then once a player transfers $1,000 to the casino player account, the limit amount is satisfied and no more funds can be manually transferred down to the casino player account by the player. However, in this digital wallet system, transaction limits may be consolidated and managed across all of the player's accounts. As an example, presume a player initially withdraws $500 from the external provider for a gaming session at a first property and finishes that gaming session with a $1,000 balance. After cash out, the digital wallet system automatically transfers the $1,000 balance from the gaming device to the casino player account and out to the external provider account of the player. The player can subsequently withdraw $1,000 from the external account (e.g., for gaming at the first property or a second property) without exceeding the $1,000 limit because the $500 initially transferred down to the game was returned to the external provider. In some embodiments, limits may be configured and implemented per property or across multiple properties, perhaps based on regulatory requirements for particular jurisdictions.

Other implementations could vary the daily fund transfer limit using AI and/or rule-based decision engine. The decision engine could be based the maximum limit according to historical game play, certain external events (e.g., Player Paycheck Pay Day).

The disclosure also includes various implementations that present and generate random based game outcomes (e.g., bingo game outcomes, predetermined game outcomes, and/or lottery game outcomes) for remote game play. In one or more implementations, a remote game system can be physically located in a designated gaming zone and/or other zones defined for wagering game play. The remote game system is setup to provide remote game play for one or more remote gaming devices (e.g., a mobile device). The remote game system can generate multiple virtual gaming services, where each virtual gaming service represents a virtual version of a gaming device typically located on a casino floor (e.g., Class II EGM or video lottery terminal). Each virtual gaming service is allocated to support remote game play on a remote gaming device by having a game module to initiate and execute game instances (e.g., rounds of play), a funding module to facilitate and manage fund transactions, and a metering module to track wager and other metering information throughout a gaming session.

In a Class II implementation, following a remote gaming device establishing a gaming session with the remote game system and initiating a game instance (e.g., pressing a spin button), the allocated virtual gaming service joins a multiplayer game (e.g., an electronic bingo game). The remote game system can include or is coupled to a central determination gaming system (e.g., a bingo server) that initiates one or more sequence listings (e.g., bingo or lottery ball calls). After joining the multiplayer game, the virtual gaming service compares a given sequence listing (e.g., a bingo number listing) with a selected pattern and/or sequence of symbols and/or numbers (e.g., a bingo card) to possibly determine one or more designated game patterns (e.g., bingo patterns). Afterwards, the virtual gaming service evaluates the designated game patterns according to one or more pay tables to determine one or more game outcomes (e.g., payout of 100 game credits). The virtual game service then determines and sends presentation information corresponding to the game outcomes to the remote gaming device. In one example, the virtual gaming services can directly dictate and provide the presentation game outcomes to the remote gaming device. In another example, the virtual gaming services indirectly communicates the presentation game outcomes by providing presentation related information (e.g., one or more RNG seeds or credit values) to the remote gaming device for it to derive the presentation game outcomes.

The disclosure also includes various implementations to fund real money wagering for remote game play. In one example, remote game play can be funded with a prepaid game voucher (e.g., a TITO ticket), which can also be referenced as a "prepaid game token," "pre-purchased remote game play token" or more generally as a "token" throughout this disclosure. The prepaid game voucher can be a physical and/or digital voucher that a player purchases within a designated gaming zone and/or other wager-enabled zones prior to remote game play. For a physical, prepaid game voucher, a remote gaming device scans the prepaid game voucher and stores information related to and/or a scanned digital image of the prepaid game voucher. The remote gaming device forwards related information and/or the scanned prepaid game voucher to a voucher system for funding verification. After verifying the prepaid game voucher, the voucher system sends a verified voucher value to the virtual gaming services to use for game play. The remote gaming device presents via a user interface (UI) on a mobile application the credit balance loaded onto one or more credit meters and other funding information. In another example, rather than utilizing a prepaid game voucher, the remote gaming device may initiate the transfer of funds to and from a player's wagering account that includes one or more digital wallets. As an example, a digital gaming wallet linked to a player's wagering account may be customized to facilitate and manage gaming related transactions, such as transferring funds to the virtual gaming service to load onto credit meters.

In terms of technical effects, the one or more remote game play implementations described throughout the disclosure deliver improvements to gaming systems and/or overall gaming environment by providing new and/or improved gaming device and/or system operations that comply with gaming regulations. Specifically, a remote gaming device is specially programmed to present game outcomes inside and/or outside typical gaming zones by decoupling the presentation of game outcomes with the generation of random-based game outcomes. The remote gaming device offloads the generation and/or evaluation of random based game outcomes to a remote game play system to avoid being classified as a wagering game device restricted to a designated gaming zone. The remote game play system, which could be located within a designated gaming zone, includes virtual gaming services that perform functionality associated with wagering gaming devices. To simplify integration within existing game system components, the remote game play system can act as middleware system that interfaces and communicates with an central determination game system (e.g., bingo server), a casino management system, and/or other existing gaming and casino systems. The remote game play system also supports multiple funding options for remote gameplay that comply with one or more jurisdictional regulations. These and other technical features are described in greater detail later in the disclosure.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards. Additionally, or alternatively, one or more of gaming devices 104A-104X may be configured as a tabletop game, as shown below in FIG. 4A.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communications networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
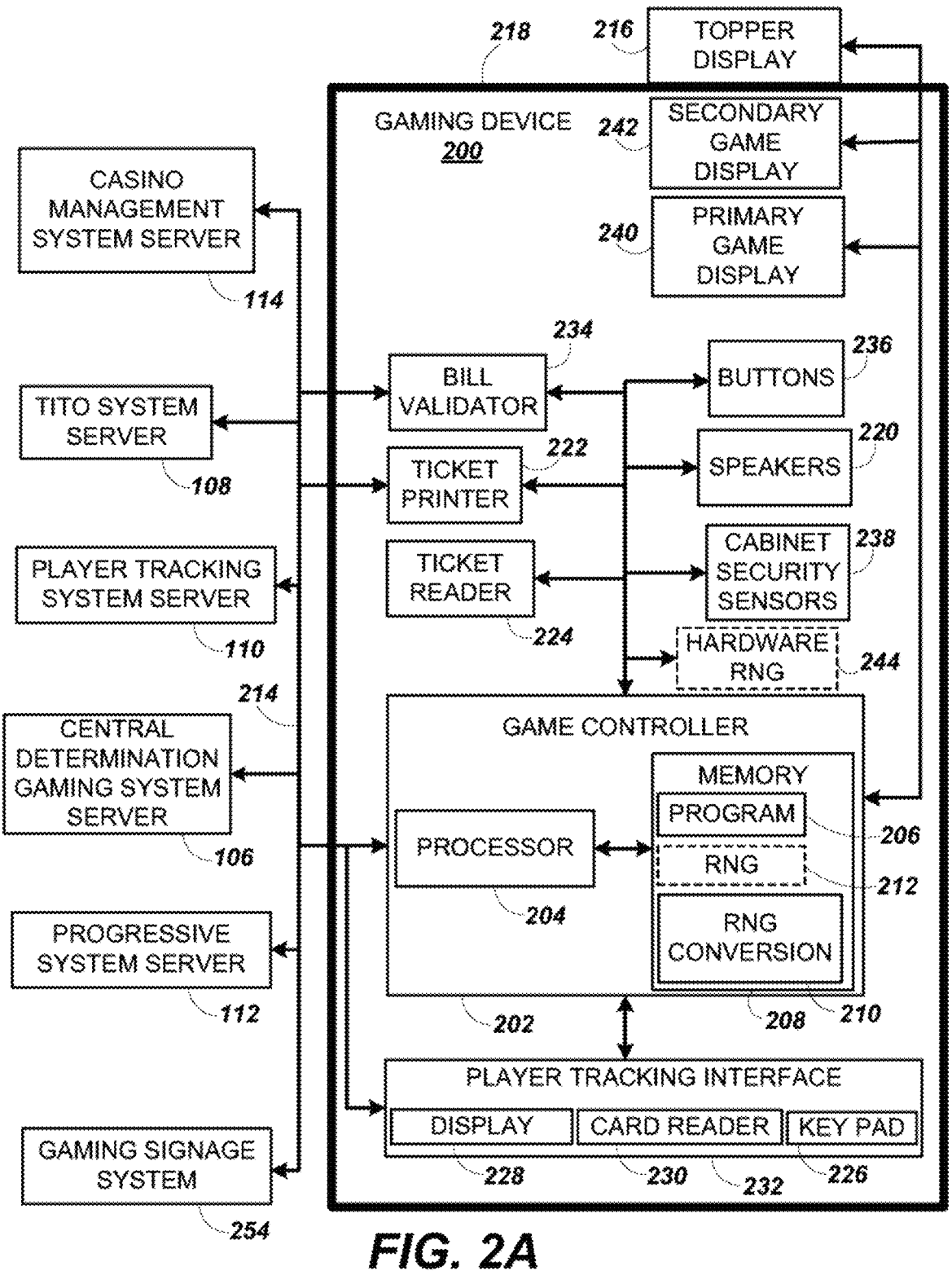
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Although gaming devices 104A-104X are shown in FIG. 1 as upright EGMs, the systems and methods described herein can be used on upright EGMs or table type EGMs as shown in FIG. 4A.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
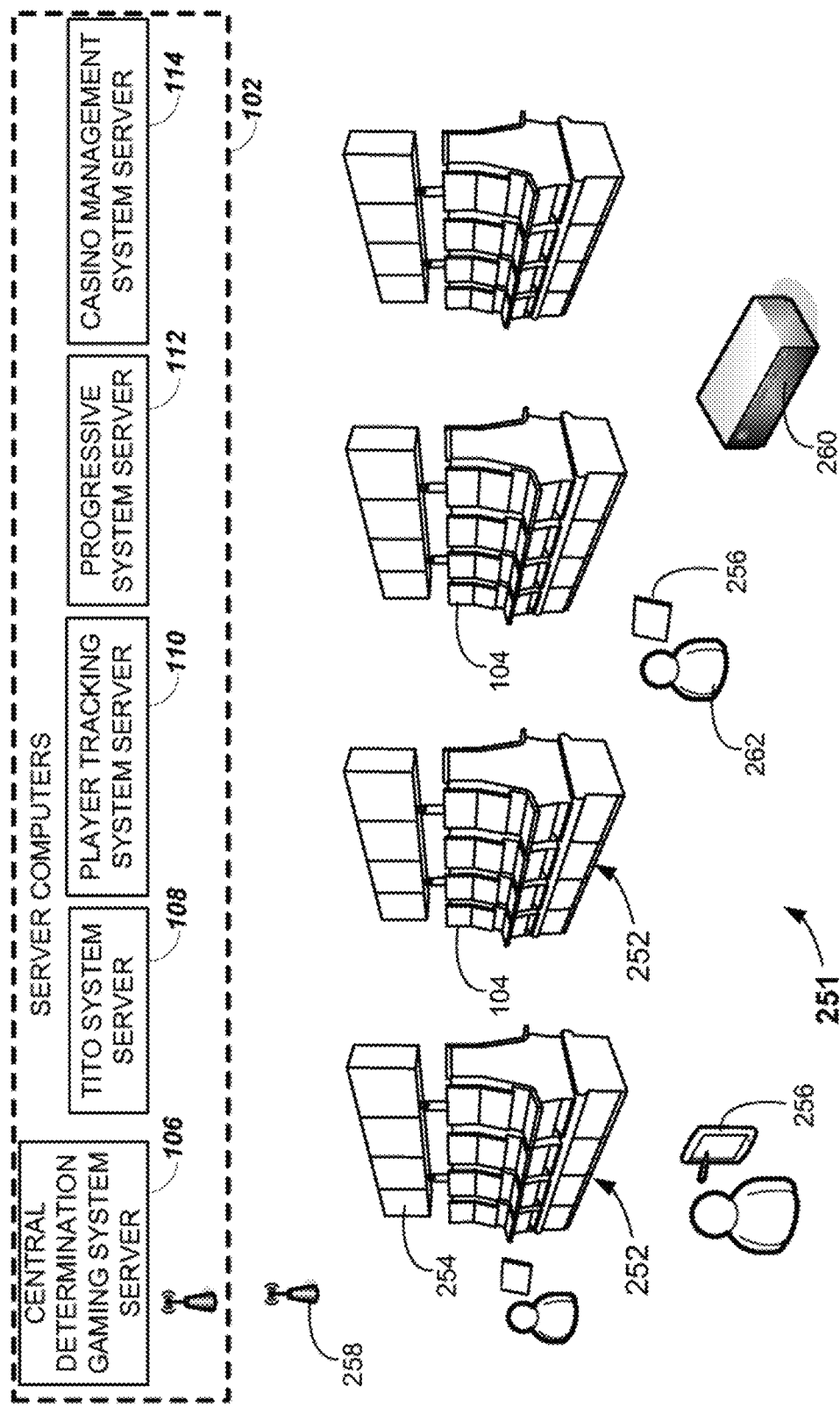
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG.

2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 570a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
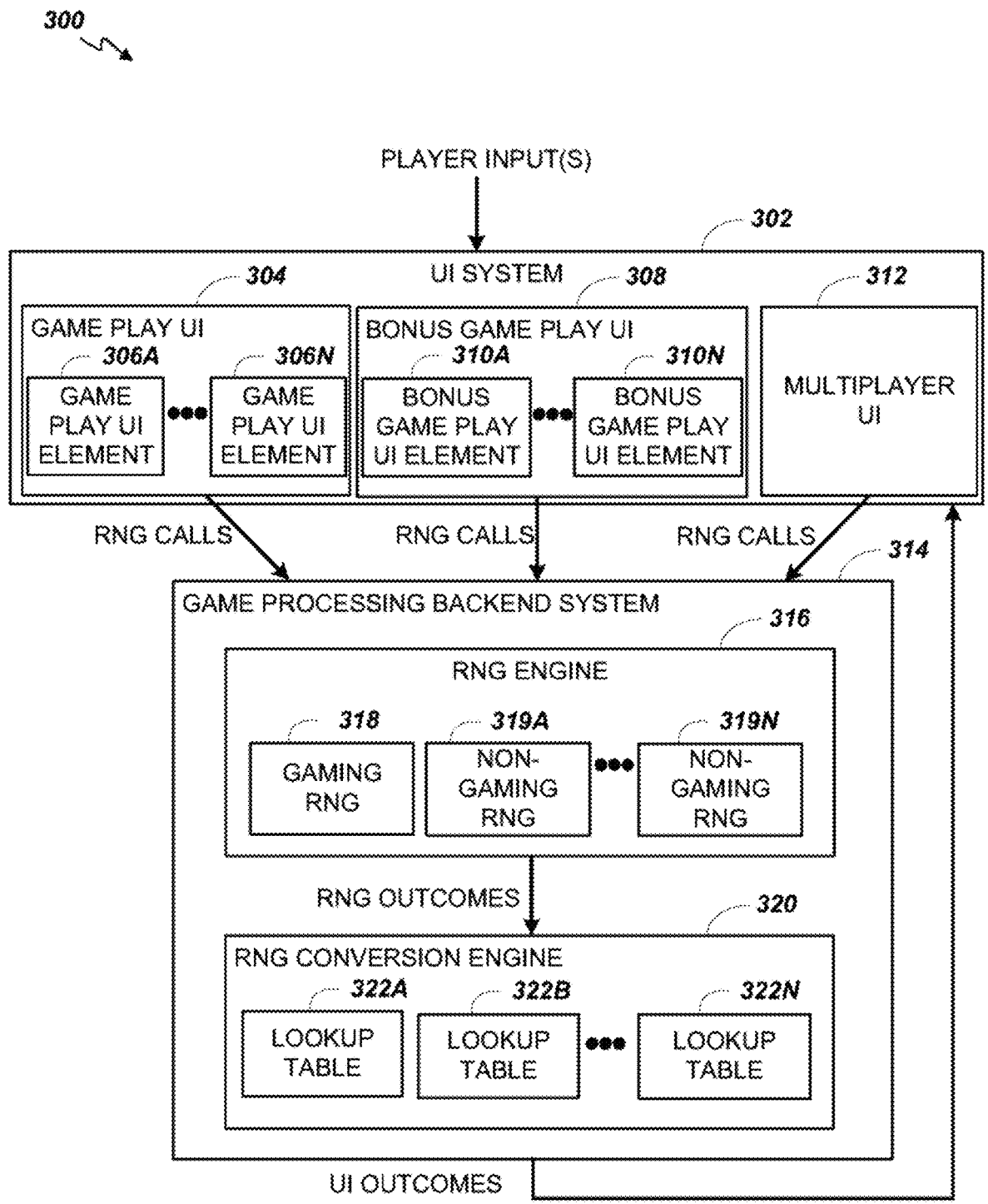
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

FIG. 4A is an architecture diagram illustrating components of an example digital wallet system 400. In the example embodiment, the digital wallet system 400 facilitates digital wallet transactions for wager gaming sessions of a player 402 using their mobile device 404 in conjunction with a digital wallet system server 414 and other components as shown herein. The digital wallet system server 414 performs withdrawal and deposit type transactions on behalf of the player 402 with an external provider server 416 (e.g., a third party digital wallet service) and one or more casino management systems 420 (e.g., casino operators, properties, or the like), who operate gaming devices 426 (e.g., EGMs 104, wagering table games 422, kiosks, or the like).

The digital wallet system 400 establishes or otherwise utilizes various funds accounts of the player 402. In this example embodiment, the player 402 has an external player account 410 established with the external provider server 416 that is used to store funds that may be used for wager gaming. The external provider server 416 may facilitate digital wallet transactions or other transactions to move funds between the external player account 410 and various financial institutions 418 or other funds sources of the player 402 (e.g., bank accounts, debit cards, credit cards, or other payment cards). For example, such transactions may include deposit or withdrawal transactions between the external player account 410 and accounts of the player 402 at the financial institutions, in some cases establishing an outstanding balance within the external player account 410 of the player that is made accessible for digital wallet-based transactions performed by the system 400 described herein.

The player also has a casino player account 408 established with a gaming operator (e.g., a casino or other wagering venue). The gaming operator utilizes a casino management system (or just "CMS") 420, such as the Oasis® system (made commercially available by Aristocrat® Technologies, Inc.). The CMS 420, amongst many other functionalities, manages certain aspects of gaming devices 426 at one or more properties of the operator. The casino management system 420 may also provide a player loyalty system through which players 402 register and participate in rated game play and receive loyalty benefits. In the example embodiment, the CMS 420 also establishes and maintains the casino player account 408 for the player 402. The casino player account 408 provides a wagering account through which the player 402 can easily establish wagering funds at the gaming devices 426 (e.g., via credit transfers between the casino player account 408 and the gaming devices 426 in cash-in and cash-out transactions).

Further, in the example embodiment, the player 402 has a digital wallet application 406 and a player application (or "player app") 412 installed on their mobile device 404. While these apps are shown separately for purposes of illustration, it should be understood that the player app 412 may contain the digital wallet (e.g., as an embedded functionality). The apps 406, 412 may be provided by the casino operator, the casino management system 420, the digital wallet system server 414, or a third party service provider. The player app 412 may allow the player 402 to wirelessly connect with gaming devices 426 at various gaming properties, establish rated gaming sessions (e.g., wirelessly card into gaming devices 426), interact with aspects of their loyalty account, or various other functionalities. In the example embodiment, the player app 412 allows the player 402 to perform digital wallet transactions via the digital wallet app 406. The digital wallet app 406 allows the player 402 to establish protected access to and perform privileged transactions with their external player account 410 and one or more casino player accounts 408. Each individual casino player account 408 may be associated with an individual gaming property (e.g., a single casino), a group of gaming properties (e.g., co-owned by the same gaming operator), or a particular gaming operator.

During a gaming session, the player 402 wishes to participate in wager gaming at a particular casino. For example, the player 402 may wish to begin a gaming session with $200 at a particular EGM 104 at this casino, shown here as local gaming device 424. Presume, for example, that the player 402 has previously established a $1,000 balance in their external player account 410 (e.g., via a withdrawal from a bank account), but currently has a $0 balance within their casino player account 408 at this property.

In conventional systems, the CMS 420 may allow the player 402 access to transfer funds between their casino player account 408 and the local gaming device 424, but in this situation, there is no balance. As such, under this conventional system, the player 402 may have to separately execute a transaction from the external player account 410 to the casino player account 408, and then initiate another transaction (e.g., a cash in transaction) from the casino player account 408 to the local gaming device 424 to establish play credit at the device 424 (e.g., in meter credit, chips, or the like). Further, when the player 402 concludes their gaming session at the local gaming device 424, the player 402 may initiate a cash-out transaction (e.g., to move any remaining balance from the local gaming device 424 to the casino player account 408), but this transaction leaves the balance of funds in the casino player account 408. If the player wishes to move to a different gaming property, this example casino player account 408 may not be directly accessible at the other gaming property. As such, the player 402 may be confused as to where their funds reside, and may be forced to initiate a transaction to move that balance from the casino player account 408 out to the external player account 410 before then moving the funds from the external player account 410 down into another casino player account 408 at the second gaming property.

In the example embodiment, the digital wallet system 400 automatically facilitates some of these transactions when the player 402 takes certain actions. In one example, when the player 402 begins the gaming session at the local gaming device 424, the player app 412 may allow the player 402 to open a gaming session at the local gaming device (e.g., via wireless connectivity between the local gaming device 424 and the mobile device 404 of the player). Once the player 402 has established authenticated connectivity to a particular gaming device 426 (e.g., to the local gaming device 424), the system 400 may allow the player 402 to initiate a withdrawal of $200 for this gaming session. Upon receipt of this request, in this example, the system 400 executes a withdrawal transaction to move $200 from the external player account 410 of the player to the casino player account 408 and also automatically executes a second transaction to move the $200 from the casino player account 408 to the local gaming device 424. After successfully executing both transactions, the local gaming device 424 receives the $200 gaming funds (e.g., as additional credit on the credit meter of an EGM 104, as approval to hand out $200 chips at a gaming table 422, or the like).

When the player 402 concludes their gaming session, the player 402 may conclude their gaming session in one of many ways, each of which may cause the system 400 to perform a cash-out process and associated transactions. In some embodiments, the player 402 may press a "cash-out" button on an EGM 104. In some embodiments, the player 402 may disconnect their mobile device 404 from the local gaming device 424 (e.g., via loss of power, moving the mobile device 404 too far away from the local gaming device 424, initiate a disconnect feature within the player app 412, or the like). In some embodiments, the player 402 may ask a dealer to cash out at a table game 426 (e.g., handing the balance of their chips to the dealer) and the dealer may initiate the cash-out process (e.g., via a table management device, not separately shown).

When the cash-out process has been initiated, the system 400 may perform a cash-out transaction to move the balance credit amount into the casino player account 408. For example, in scenarios involving an EGM 104, the EGM 104 may deduct the balance credit amount from the credit meter on the local gaming device 424 and the system 400 may perform a deposit transaction for the balance credit amount into the casino player account 408. In scenarios involving table games 422, the dealer may collect chips from the player 402 and manually enter or automatically count chips to determine the balance credit amount. Upon receipt and accounting of the chips, the dealer may place the chips into the chip tray at the table 422 and confirm collection of the balance amount via the table management device, thereby beginning the cash-out process performed by the system 400. Further, the system 400 may also automatically initiate a second transaction, a deposit transaction, to move the balance credit amount from the casino player account 408 out to the external player account 410 of the player 402. The automatic performance of multiple transactions during both the cash-in and cash-out processes when establishing and concluding gaming sessions allows these funds to be moved to and from a more accessible account (e.g., the external player account) rather than leaving the funds in the casino player account 408. In some sense, the system 400 masks the casino player account(s) 408 from the player by automatically moving the funds through these accounts without leaving funds in those casino player accounts. As such, if the player 402 moves to a different casino property, the funds balance can be easily viewed via the external player account 410 and another pair of transactions can be executed to move play funds from the external player account 410 into another local gaming device 424 at this or another gaming property (e.g., regardless of whether the properties use the same casino player account 408 or different player accounts 408). In some embodiments, cash-outs (e.g., and or cash-ins such as moving funds from an external player account 410 to a casino player account 408) may automatically be performed upon detection of a player leaving and/or entering a gaming property.

The centralization of wagering funds from and to the external player account 410 also allows the system 400 to more accurately enforce responsible gaming limits. The system 400 may, for example, allow the player 402 to configure gaming limits for their own game play. In some embodiments, the player 402 may, for example, establish a daily loss limit or daily withdrawal limit, or other time-based limit, such as $500 per day loss limit. In conventional systems, these limits may not be enforced across multiple operators or multiple properties, as the transactions performed at one property may not be visible to the other operations.

In the example embodiment, the system 400 provides a centralized responsible gaming component that can view transactions across multiple properties and multiple operators. More specifically, the system 400 tracks withdrawal and deposit transactions for the player 402, both at the casino account level as well as the external player account level. When the player 402 conducts the $200 withdrawal, the system 400 debits the withdrawal amount from the daily limit of the player and allows the transactions to occur because the daily limit has not been exceeded. If the player 402 performs the cash-out process through the system 400 (e.g., as described above), the system 400 can credit the daily limit based on the balance amount deposited back up to the external player account 410. Since the system 400 sees transactions performed across multiple operators or properties, the scope of the responsible gaming limits are allowed to be enforced more broadly than any single operator or single property.

Figure 4B:
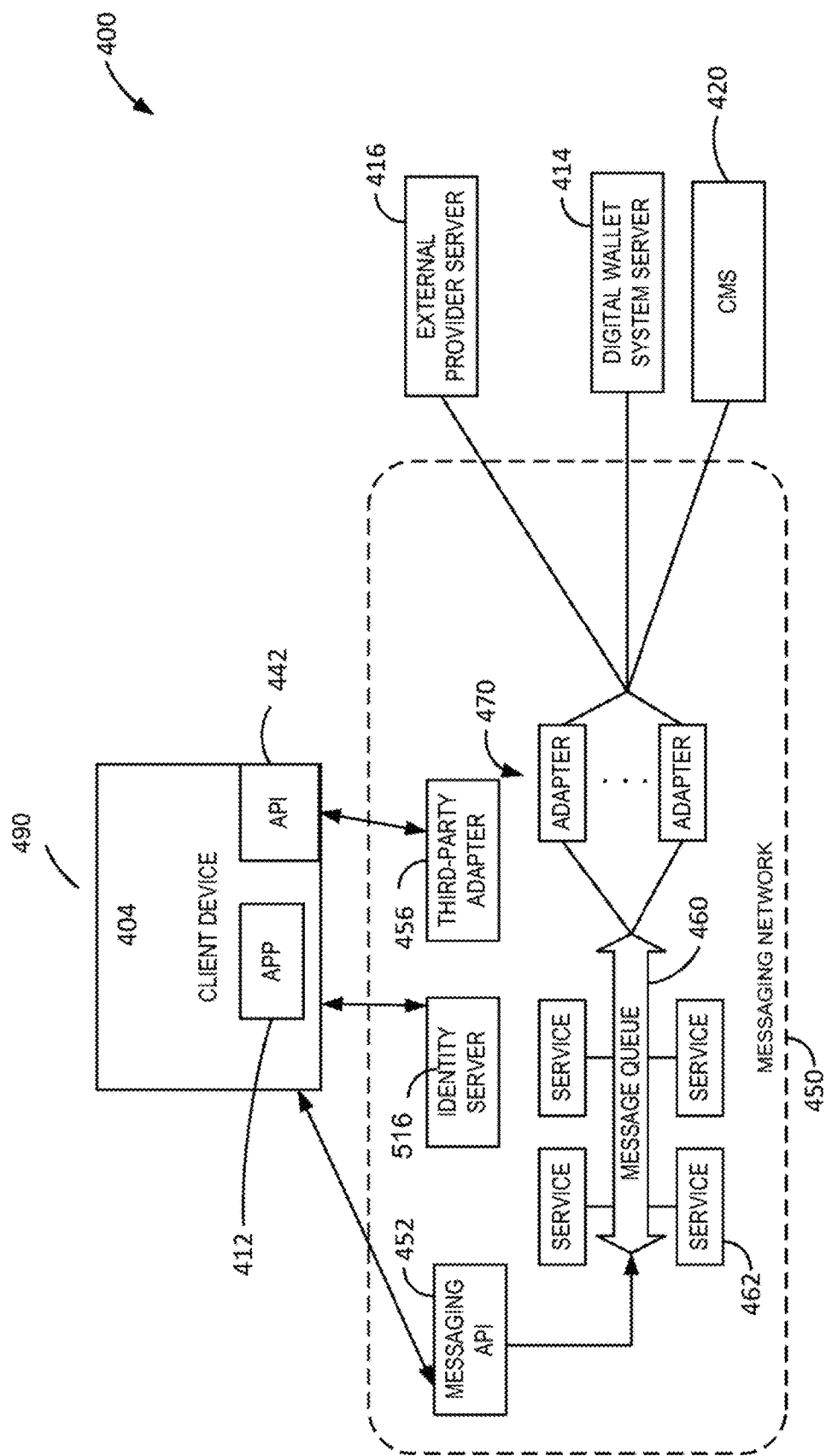
FIG. 4B is an architecture diagram illustrating components of an embodiment of the example digital wallet system shown in FIG. 4A.

FIG. 4B illustrates an architecture diagram illustrating components of an embodiment of the example digital wallet system 400. In the example embodiment, the digital wallet system 400 supports transfers of funds/credits across a pool of managed devices 490, the digital wallet server 414, and an external provider (e.g., such as a financial institution at external provider server 416). The direct-managed devices 490 may be similar to the devices 104, 422, 426 as shown and described in relation to FIG. 4A, and such direct-managed devices 490 (e.g., client device 404) may, in some embodiments, directly communicate with the digital wallet system server 414). Messages may be transmitted from the digital wallet system server 414 through adapters 470 and out through a third-party adapter 456 that is configured to communicate with an API 442 of the third-party server 440. Device 404 and/or devices 490 may be in communication with an identity server 516 (e.g., an authentication server configured to authenticate requests).

In the example embodiment, the messaging network 450 is configured to communicate with an external provider server 416 to facilitate funds transfers controlled by the digital wallet system server 414 for an external player account 410 associated with external provider server 416.

In some embodiments, the digital wallet system server 414 may receive device registration event messages from the managed devices 490. These device registration event messages provide device details for each of the devices 490. Device registration is provided to allow the digital wallet system server 414 to establish certain details about devices 490, such as unique device IDs, device types, game types provided, seat positions or unique position IDs (e.g., for table game), login IDs or loyalty IDs or mobile device IDs (e.g., for mobile device players 402, for players 402 establishing carded gaming sessions, for players 402 wirelessly connecting with their mobile devices 404). The digital wallet system server 414 may thus recognize, register, and consider eligibility of the various devices 490 for the various funds transfers controlled by the digital wallet system 400.

In the example embodiment, the messaging network 450 provides a message queue 460 and a set of adapters 470 that are configured to receive and manage a queue of event messages and convert those event messages into a format and protocol understood by the digital wallet system server 414 and/or external provider server 416. For example, in one embodiment, the messaging API 452 may act as a RESTful API ("representational state transfer"), receiving event messages in XML, HTML, or JSON format and may provide event messages in Advanced Message Queuing Protocol (AMQP) to the message queue 460. In the example embodiment, the message queue 460 is provided by RabbitMQ, an open source message broker (made available under Mozilla Public License) that provides various services 462 and a set of adapters 470 that may be configured to convert AMQP messages into streaming text oriented messaging protocol (STOMP), and vice versa. For example, incoming session start event messages, wager event messages, and session termination event messages may be received at the messaging API 452, provided onto the message queue 460 and adapters via AMQP, and converted into STOMP, or another suitable format, when forwarded to the digital wallet system server 414.

Further, the digital wallet system 400 also facilitates certain communications to the devices 490 and the external provider server 416. For example, when a device is registered (e.g., after processing of a device registration event message), the digital wallet system server 414 may transmit a registration confirmation message back to the devices 490. When a session termination event message is received by the digital wallet system server 414 (e.g., from one of devices 490), the digital wallet system server 414 may transmit a session termination confirmation message back to the devices 490. Such messages may be transmitted from the digital wallet system server 414 through adapters 470 configured to communicate with external provider server 416 and/or devices 490, where each stage of communication may include a message protocol conversion in reverse of the inbound communications described above.

While only one external provider server 416 is illustrated in FIG. 4B, it should be understood that the architecture provided by the messaging network 450 of the example digital wallet system 400 may be configured to support many third parties and various types of gaming devices. For example, the digital wallet system 400 may support table games 426, several servers that each individually support EMGs 104, table games 426, and/or mobile gaming devices 404 at various particular gaming properties, several servers that provide mobile gaming platforms for mobile gaming devices 404 (e.g., mobile class-2 gaming, virtual gaming, or the like), and may also support various devices 490 at one or more gaming properties.

Figure 5:
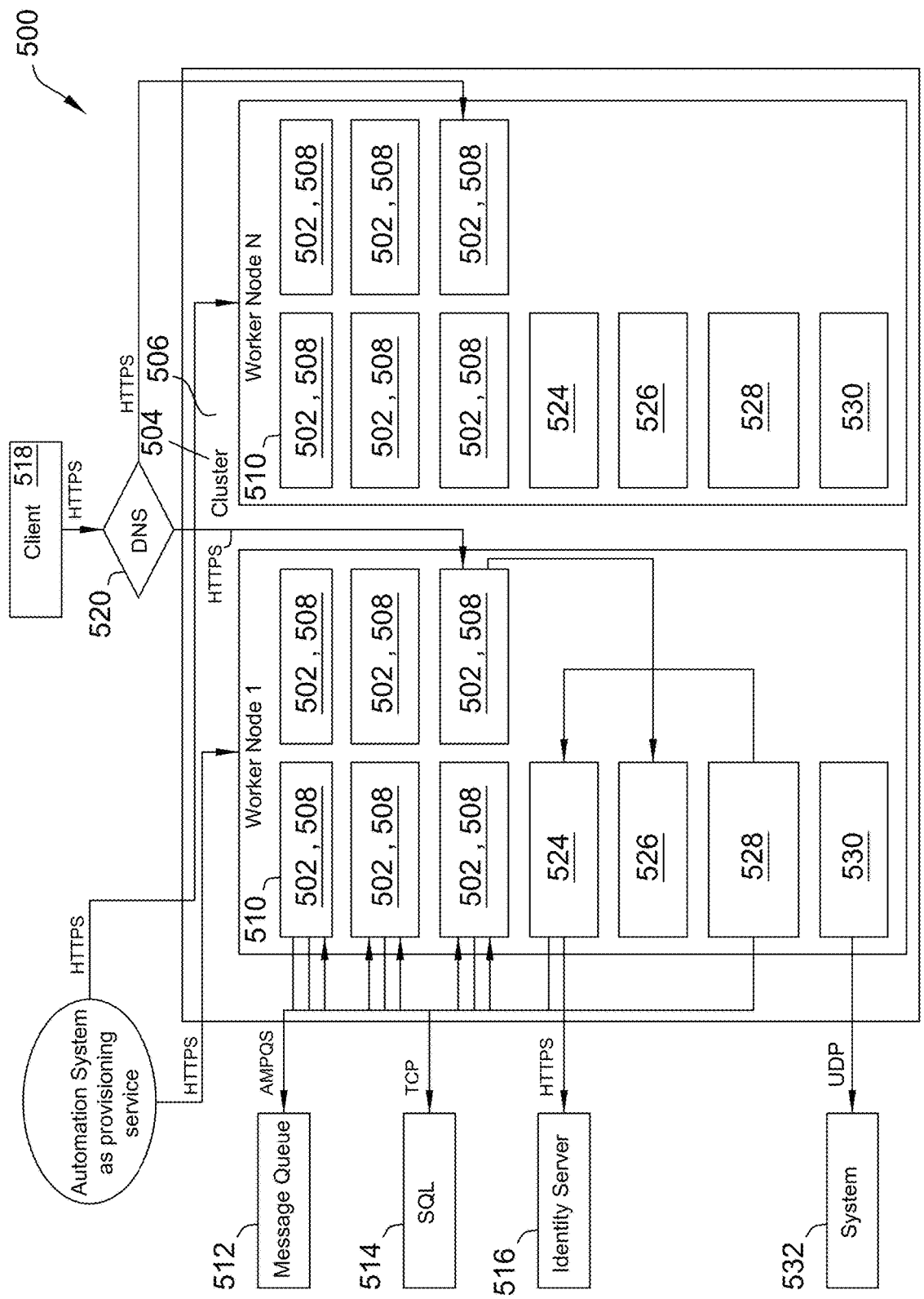
FIG. 5 is an architecture diagram of components of an example digital wallet system.

FIG. 5 is an architecture diagram of components of an example digital wallet system 500. The digital wallet system 500 may be similar to the digital wallet system 400 shown in FIGS. 4A and 4B. In an example embodiment, the digital wallet system 500 performs digital wallet functionality associated with electronic gaming. For example, the digital wallet system 500 may perform transactions supporting wagering activity of a player at a wagering venue (e.g., at a casino property, via online gaming, or the like). The digital wallet system 500 may provide one or more nodes 502 of a cluster 504 (e.g., Kubernetes Cluster) that act as processing engines for computational activities performed by the digital wallet system 500 (e.g., across multiple machines and/or environments).

Nodes 502 may include a master node 506 and one or more worker nodes 508 (e.g., physical computers and/or virtual machines). The master node 506 may be configured to control the worker nodes 508 (e.g., scheduling and scaling applications, maintaining a state of the cluster 504, and/or implementing updates). The worker nodes 508 may be configured to run applications to perform tasks assigned by the master node 506.

In some embodiments, node 510 includes an API (e.g., API 452) exposing a REST (representational state transfer) interface to nodes 502 and serving as a front end control plane. In some embodiments, worker nodes 508 are configured to control wallet transfer messages (e.g., withdrawals, deposits) and wallet transfer state messages (e.g., status of wallet transfers). In some embodiments, nodes 502 may be in communication with a message queue 512 (e.g., RabbitMQ), an SQL server/database 514, and/or an identity server 516 (e.g., an authentication server configured to authenticate requests to nodes 502).

Client devices 518 (e.g., mobile devices and/or other computer devices) may communicate (e.g., via domain name system (DNS) 520 and/or hypertext transfer protocol secure (HTTPS)) with the cluster during gaming sessions. In some embodiments, the digital wallet system 500 may perform digital wallet transactions on behalf of players when players begin or end play sessions, performing transactions that, for example, establish a credit balance on a given gaming machine (e.g., to EGM 104) or transfer credit off of the gaming machine at the end of the player's play session (e.g., from EGM 104 on cash out). In some embodiments, an initial cash-out transaction may target a player account for a particular property, thereby crediting that player account with any additional credit value from the EGM 104. In some embodiments, the digital wallet system 500 may automatically perform an additional transaction to move that credit value out to an external player account at an external provider. This additional transaction allows that credit value to be usable at other wagering venues, thereby allowing the player to more freely and easily start gaming sessions at those other venues. In some embodiments, the digital wallet system 500 may provide responsible gaming functionality that allows players or operators to, for example, configure limits on their wagering activities. Use of the external player account and automatic balance transfers allows the digital wallet system 500 to more effectively track player activity, and thus more reliably and accurately enforce limits.

In some embodiments, nodes 502 are in communication with an automation system 522 (e.g., via hypertext transfer protocol secure (HTTPS)) configured to handle, as examples, configuration management, application deployment, and software provisioning of nodes 502. In some embodiments, nodes may include a configuration API node 524, a configuration management user interface (UI) node 526, a configuration management backend node 528. In some embodiments, nodes 502 include a logs agent 530 in communication with a system 532 configured to receive and store data associated with nodes 502.

Figure 6:
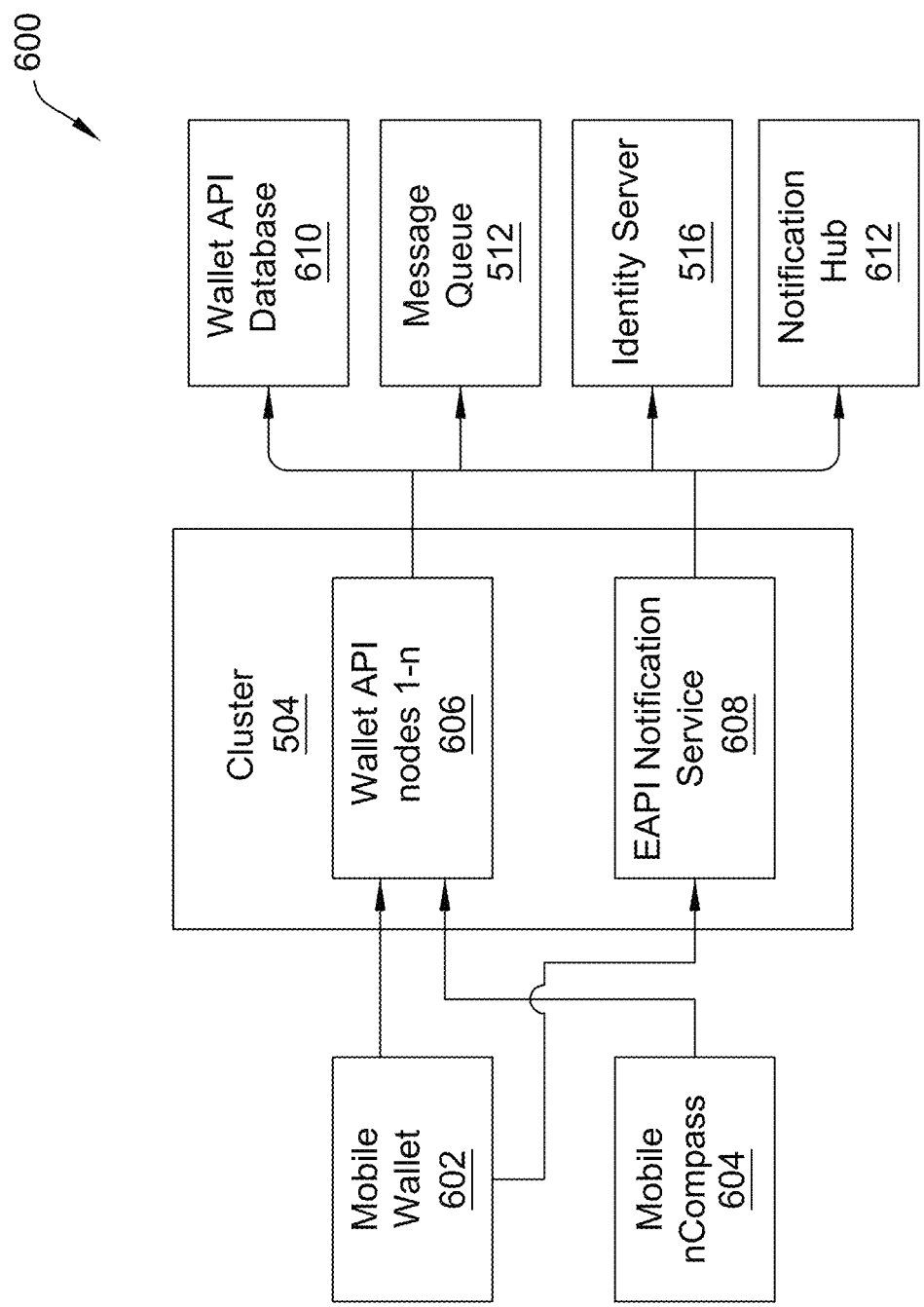
FIG. 6 is an architecture diagram of components of another example digital wallet system.

FIG. 6 is an architecture diagram of components of another example digital wallet system 600. The digital wallet system 600 may be similar to the digital wallet system 400 shown in FIGS. 4A and 4B. In this example, mobile wallets 602 (e.g., from mobile devices 404) and/or mobile nCompass units 604 (e.g., from EGMs 104 or table games) communicate with back end processing components of the digital wallet system 600 via a wallet API ("WalletEAPI") 606 (e.g., including nodes 502) and an EAPI notification service 608. In some embodiments, API 606 and service 608 are included in cluster 504. In some embodiments, the wallet API 606 and the notification service 608 may be in communication with a wallet API database 610, the message queue 512, the identity server 516, and/or a notification hub 612 configured to push notifications associated with system 600 to electronic devices (e.g., mobile devices 404).

Figure 7A:
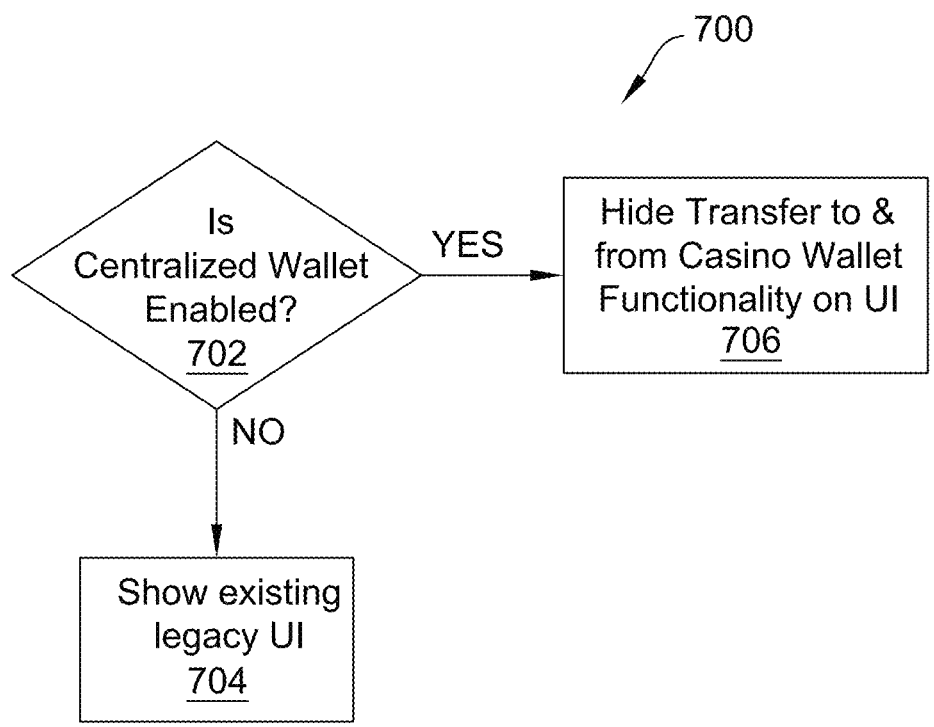
FIG. 7A and FIG. 7B are example flowcharts illustrating example operations of a digital wallet system such as the digital wallet systems shown in FIGS. 4A-6.
Figure 7B:
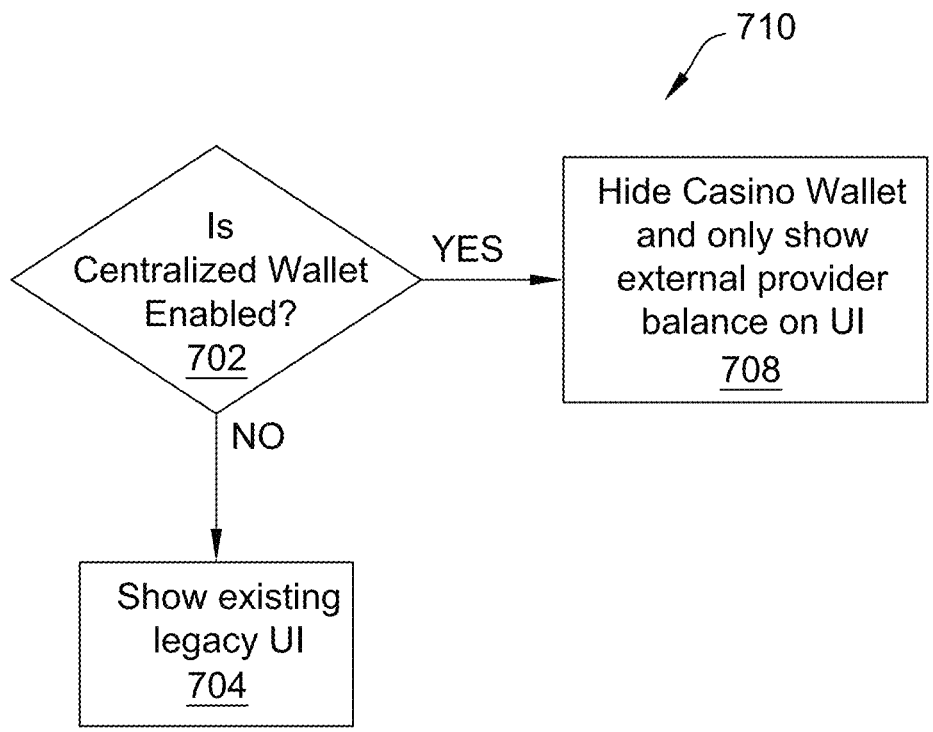

FIG. 7A and FIG. 7B are example flowcharts 700, 710 illustrating example operations of a digital wallet system such as the digital wallet systems 400, 500, 600 shown in FIGS. 4A-6. At least one of systems 400, 500, 600 determines 702 whether a centralized wallet (e.g., digital wallet) is enabled (e.g., on the mobile device 404 of a player). When a centralized wallet functionality is disabled, the player is presented 704 with a legacy user interface (e.g., via their digital wallet app, player app, or the like, on their mobile device 404). When a centralized wallet functionality is enabled, the digital wallet system may automatically perform transfers to and from casino wallets (e.g., hiding 706 the transfer to and from casino wallet functionality on the mobile device 404) and may hide 708 casino wallets from the player (e.g., via the UI) and instead only show their balance on their external player account 410.

Figure 8A:
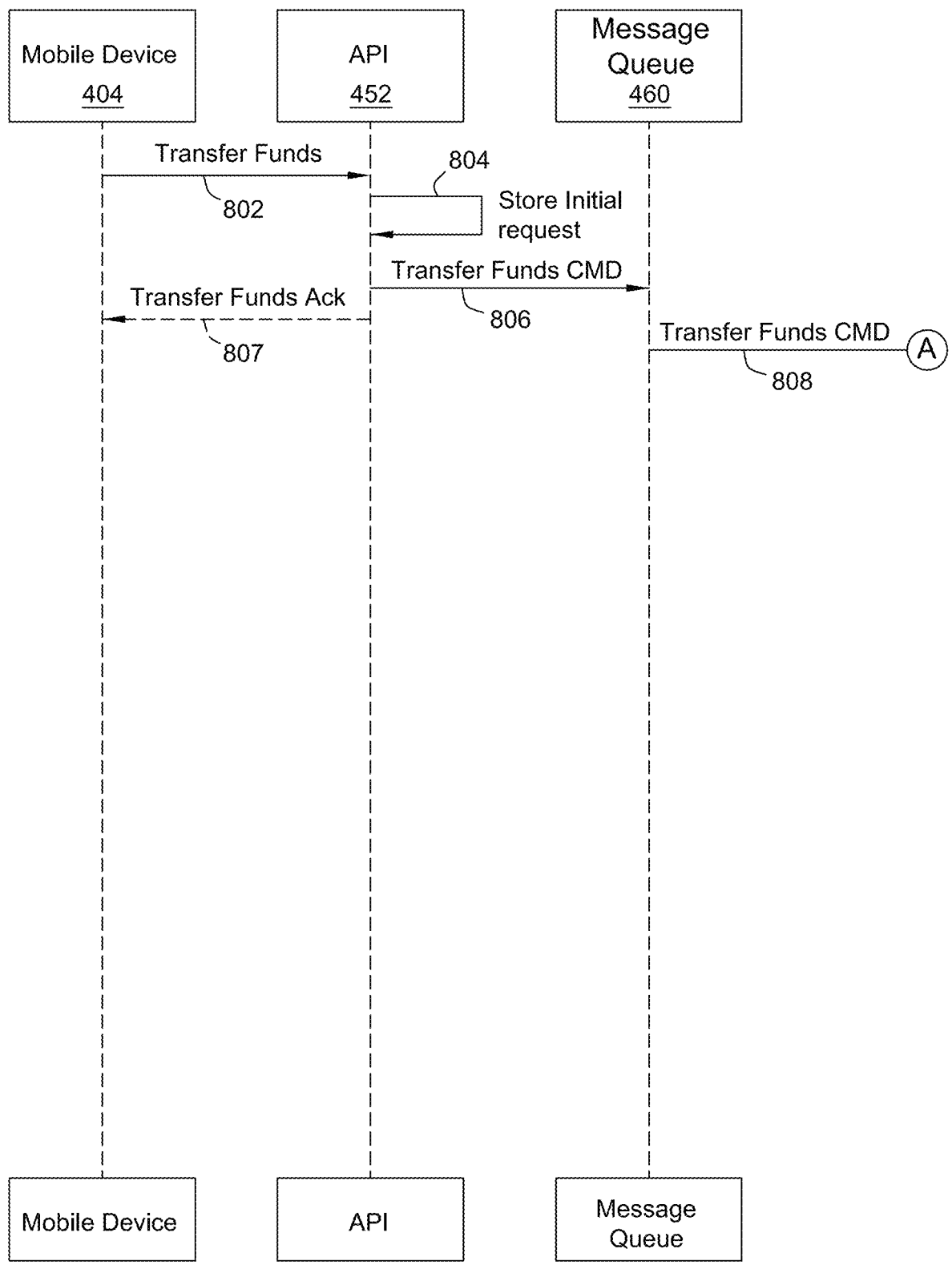
FIG. 8A illustrates an example process for fund transfers (e.g., credit and debit transactions) that may be performed by the digital wallet systems shown in FIGS. 4A-6.
Figure 8B:
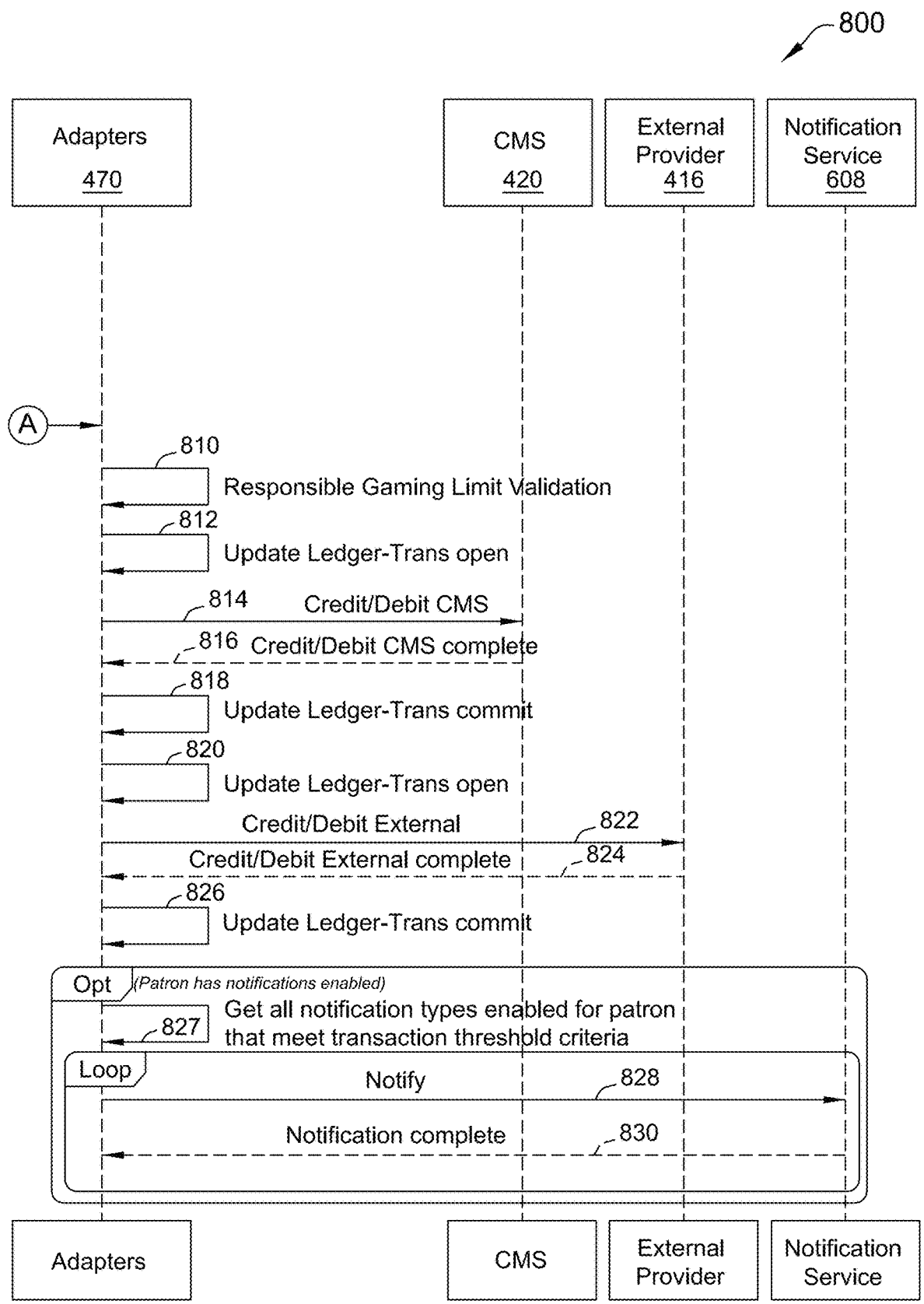
FIG. 8B is a continuation of FIG. 8A.

FIGS. 8A and 8B illustrate an example process 800 for fund transfers (e.g., credit and debit transactions) that may be performed by the digital wallet systems 400, 500, 600 shown in FIGS. 4A-6. Process 800 is performed via a plurality of devices, services, providers, etc. such as a mobile app on a mobile device 404 (e.g., a direct managed device 490), API 452, message queue 460, adapters 470, CMS 420, external provider server 416, and notification service 608. In some embodiments, API 452, queue 460, and adapters 470, as examples, FIGS. 8A-12 may include any components in network 450 and/or other components and actions described as being performed by components of network 450 may be controlled by any of the servers described herein (e.g., digital wallet system server 414).

In the example shown in FIGS. 8A and 8B, a player at device 404 may initiate a transfer funds request that is transmitted 802 to API 452. The request is then stored 804 by API 452. A transfer funds command is then generated by API 452 and transmitted 806 to queue 460. The transfer funds command may then be acknowledged in a message transmitted 807 from API 452 to device 404. Queue 460 then transmits 808 the transfer funds command to adapters 470. Adapters 470 may then check 810 for a responsible gaming limit validation (e.g., as described elsewhere herein). Adapters 470 then update 812 a ledger to indicate a transaction message will be sent to CMS 420 and then generates and transmits 814 a credit/debit message (e.g., including the transfer funds request/command) to CMS 420. CMS 420 then generates and transmits 816 a CMS complete message to adapters 470 indicating that, for example, CMS 420 has stored a record of the credit/debit message and approved the credit/debit message. Adapters 470 then update 818 the ledger according to CMS complete message and again updates 820 the ledger to indicate a transaction message will be sent to external provider server 416. Adapters 470 then generate and transmit 822 an external debit/credit message to server 416. Server 416 then facilitates completion of the requested external transaction and generates and transmits 824 a debit/credit completion message to adapters 470. Adapters 470 then update 826 ledger to indicate receipt of the debit/credit completion message. Adapters 470 may then, when the player associated with device 404 has notifications enabled, determine 827 which notifications meet a transaction threshold criteria, and generate and transmit 828 one or more messages to notification service 608 (e.g., to facilitate/control notifications sent to device 404). Service 608 then generates and transmits 830 one or more notification complete messages to adapters 470 when the notifications have been sent to the player (e.g., via device 404).

Figure 9:
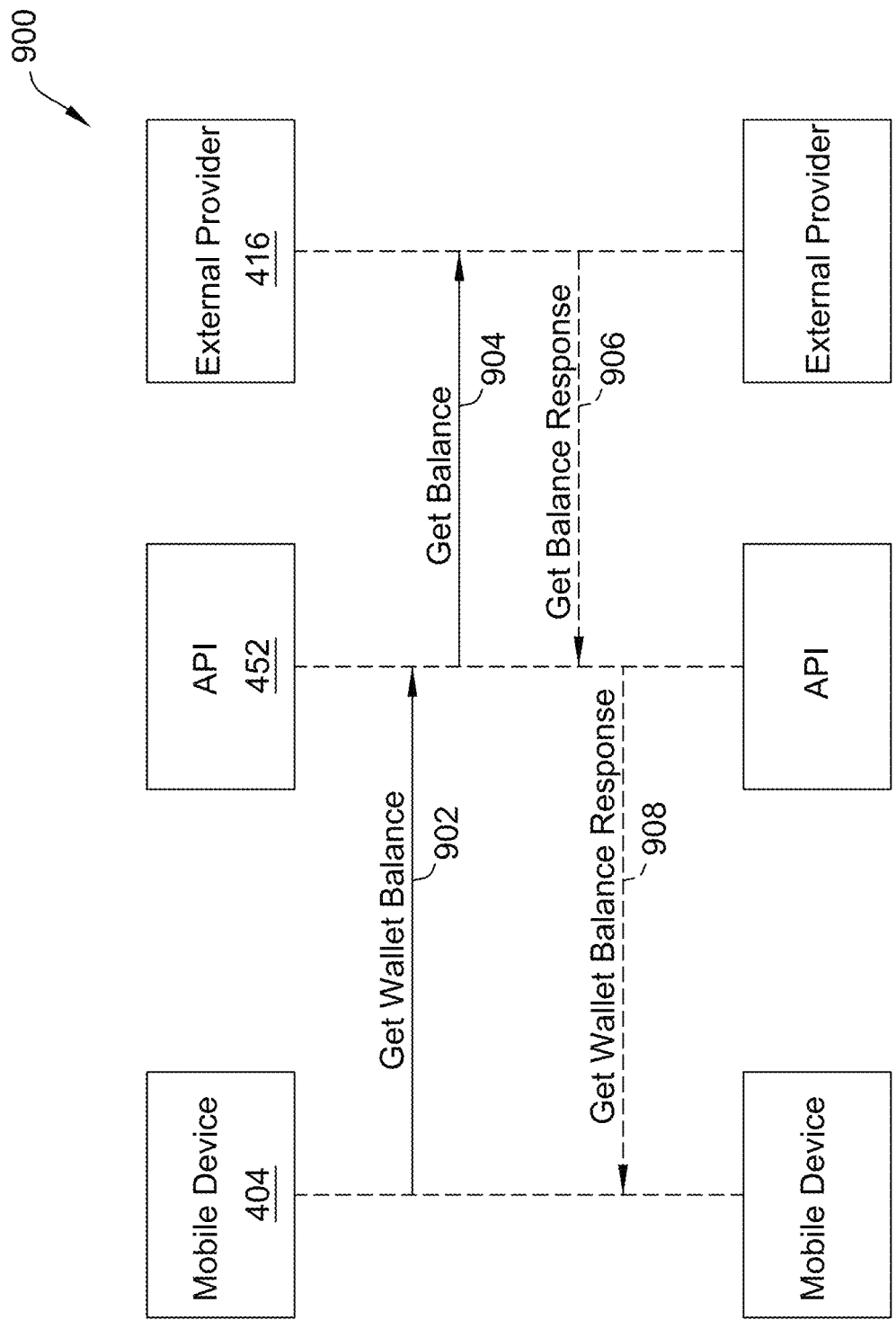
FIG. 9 illustrates an example process forgetting a balance from an external provider that may be performed by the digital wallet systems shown in FIGS. 4A-6.

FIG. 9 illustrates an example process 900 for getting a balance from an external provider that may be performed by the digital wallet systems 400, 500, 600 shown in FIGS. 4A-6. Process 900 is performed via a plurality of devices, services, providers, etc. such as a mobile app on a mobile device 404 (e.g., a direct managed device 490), API 452, and external provider server 416.

In the example shown in FIG. 9, a player at device 404 may initiate a get wallet balance request (e.g., requesting to view their digital wallet balance) causing device 404 to transmit 902 a get wallet balance message to API 452. API 452 may then generate and transmit 904 a get balance message to server 416 (e.g., requesting the digital wallet balance). Server 416 then generates and transmits 906 a balance response message (e.g., including the digital wallet balance) to API 452. API 452 then generates and transmits 908 a wallet balance response message (e.g., including the digital wallet balance) to device 404. Upon receipt of the wallet balance response message, device 404 causes display of the digital wallet balance.

Figure 10A:
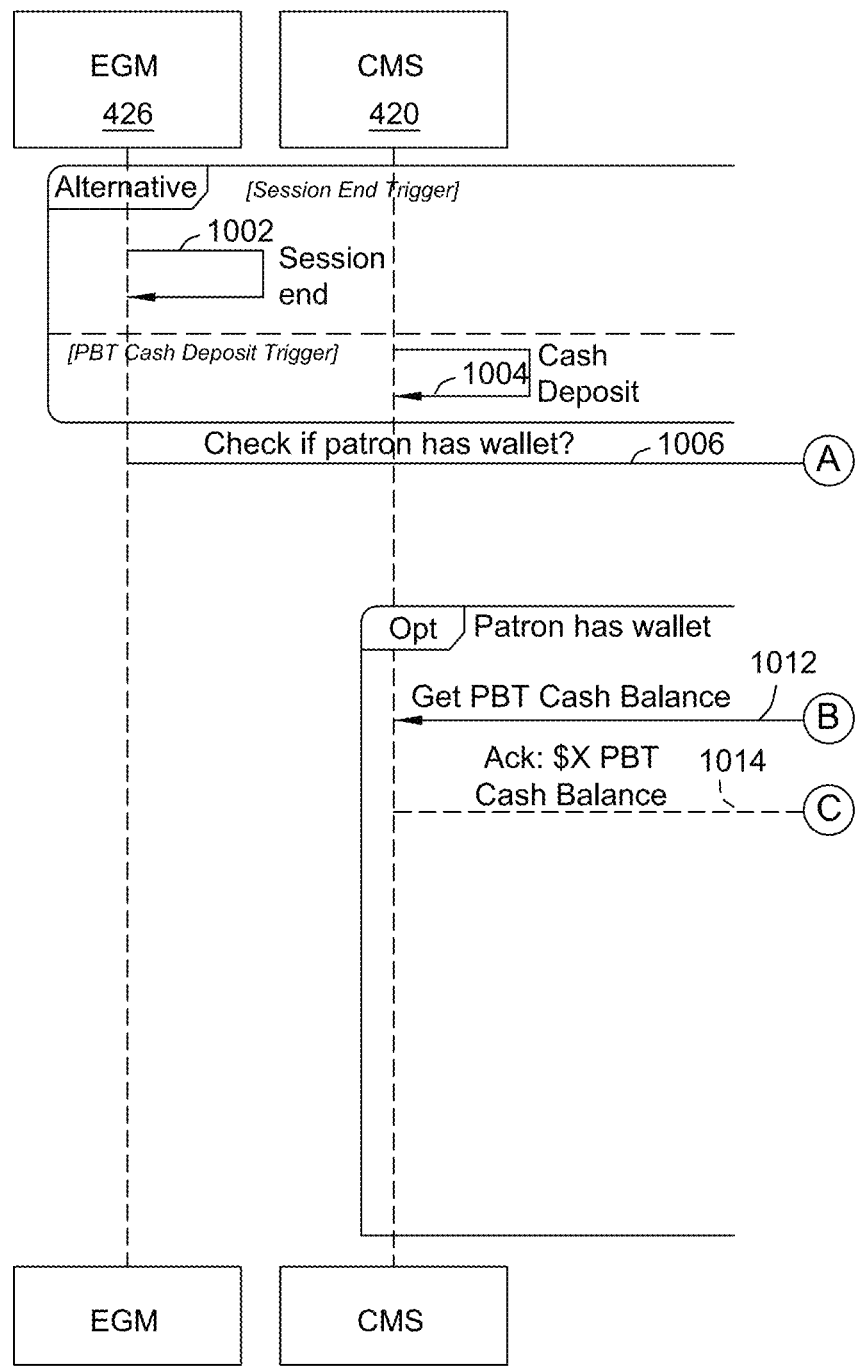
FIG. 10A illustrates an example process for automatic funds transfers that may be performed by the digital wallet systems shown in FIGS. 4A-6. In some embodiments, the process may trigger based on an end of session event (e.g., on an EGM, smart table, via mobile device, or the like) or by a CMS cash deposit.
Figure 10B:
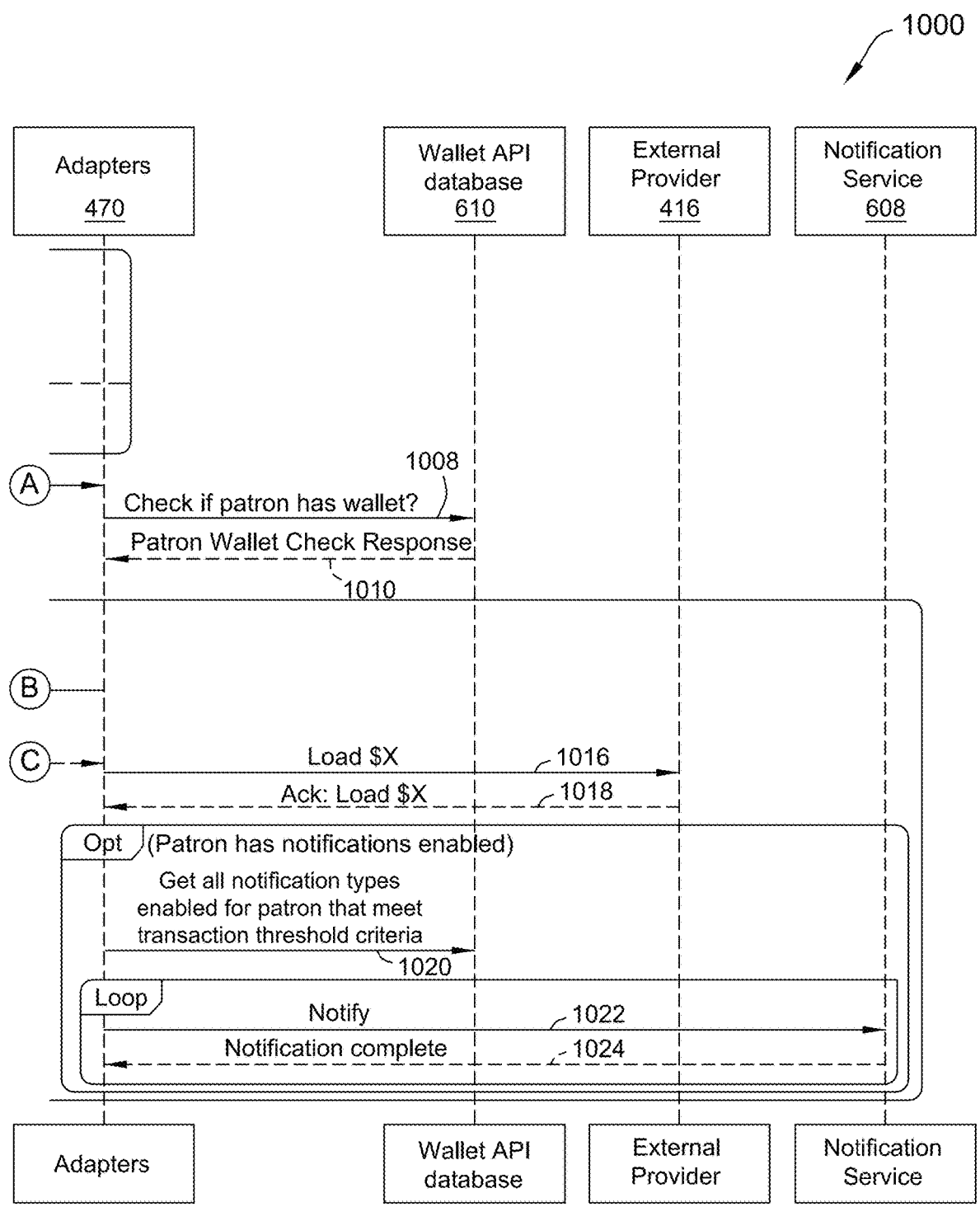
FIG. 10B is a continuation of FIG. 10A.

FIGS. 10A and 10B illustrate an example process 1000 for automatic funds transfer that may be performed by the digital wallet systems 400, 500, 600 shown in FIGS. 4A-6. In some embodiments, the process 1000 may trigger based on an end of session event (e.g., on an EGM 104, smart table, via mobile device, or the like) or by a CMS cash deposit. Process 1000 is performed via a plurality of devices, services, providers, etc. such as a gaming device 426, CMS 420, adapters 470, wallet database 610, external provider server 416, and notification service 608.

In the example shown in FIGS. 10A and 10B, a session end/cash out event is detected 1002 at device 426 and/or a cash deposit event is detected 1004 at CMS 420. Device 426 then transmits 1006 a message to adapters 470 querying to see if the player at device 426 has a digital wallet. Adapters 470 then transmit 1008 a message to database 610 to determine whether the player has a digital wallet, and database 610 responds by transmitting 1010 a message indicating whether the player has a digital wallet. If the player has a digital wallet, process 1000 proceeds.

When the player has a digital wallet, as indicated by database 610, adapters 470 transmit 1012 a message to CMS 420 requesting a balance of the player at CMS 420 (e.g., and/or device 426). CMS 420 responds by transmitting 1014 a message to adapters 470 indicating the balance of the player at CMS 420 (e.g., and/or device 426). Adapters 470 then automatically load 1016 the balance of the player to the external provider account of the player at server 416. Server 416 then acknowledges 1018 loading/depositing the balance of the player to the external provider account of the player. Accordingly, when adapters 470 determine the player associated with device 404 has notifications enabled, adapters 470 determine which notifications meet a transaction threshold criteria (e.g., by querying 1020 database 610), and generates and transmit 1022 one or more messages to notification service 608 (e.g., to facilitate/control notifications sent to device 404). Service 608 then generates and transmits 1024 one or more notification complete messages to adapters 470 when the notifications have been sent to the player (e.g., via device 404).

Figure 11:
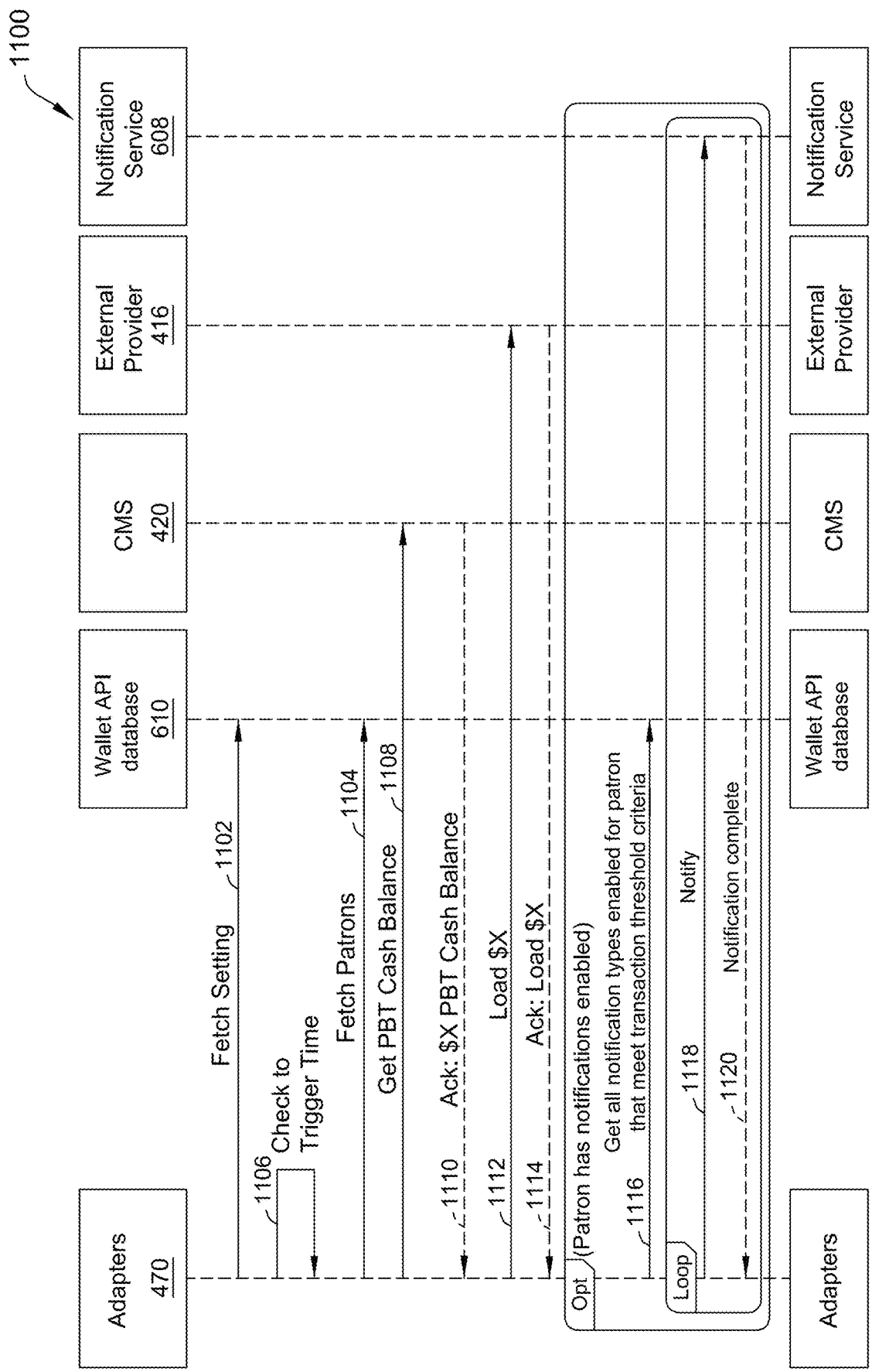
FIG. 11 illustrates an example polling process that may be performed by the digital wallet systems shown in FIGS. 4A-6.

FIG. 11 illustrates an example automatic fund transfer polling process 1100 that may be performed by the digital wallet systems 400, 500, 600 shown in FIGS. 4A-6. Process 1100 is performed via a plurality of devices, services, providers, etc. such as adapters 470, wallet database 610, CMS 420, external provider server 416, and notification service 608.

In the example embodiment, adapters 470 request and receive 1102 polling settings from database 610 and requests and receives 1104 a list of patrons/players who have a digital wallet from database 610. Adapters 470 may also check 1106 for a trigger time (e.g., in the polling settings received from database 610). Adapters 470 then transmit 1108 a message to CMS 420 requesting a balance of at least a portion of the players who have a digital wallet (e.g., as indicated by database 610). CMS 420 responds by transmitting 1110 a message to adapters 470 indicating the balances of the players requested by adapters 470. Adapters 470 then automatically load 1112 the balances of the players to the external provider account of the players at server 416. Server 416 then acknowledges 1114 loading/depositing the balances of the players to the external provider account of the player. Accordingly, when adapters 470 determine the player associated with device 404 has notifications enabled, adapters 470 determine which notifications meet a transaction threshold criteria (e.g., by querying 1116 database 610), and generates and transmit 1118 one or more messages to notification service 608 (e.g., to facilitate/control notifications sent to devices 404 of the players). Service 608 then generates and transmits 1120 one or more notification complete messages to adapters 470 when the notifications have been sent to the players (e.g., via devices 404).

Figure 12:
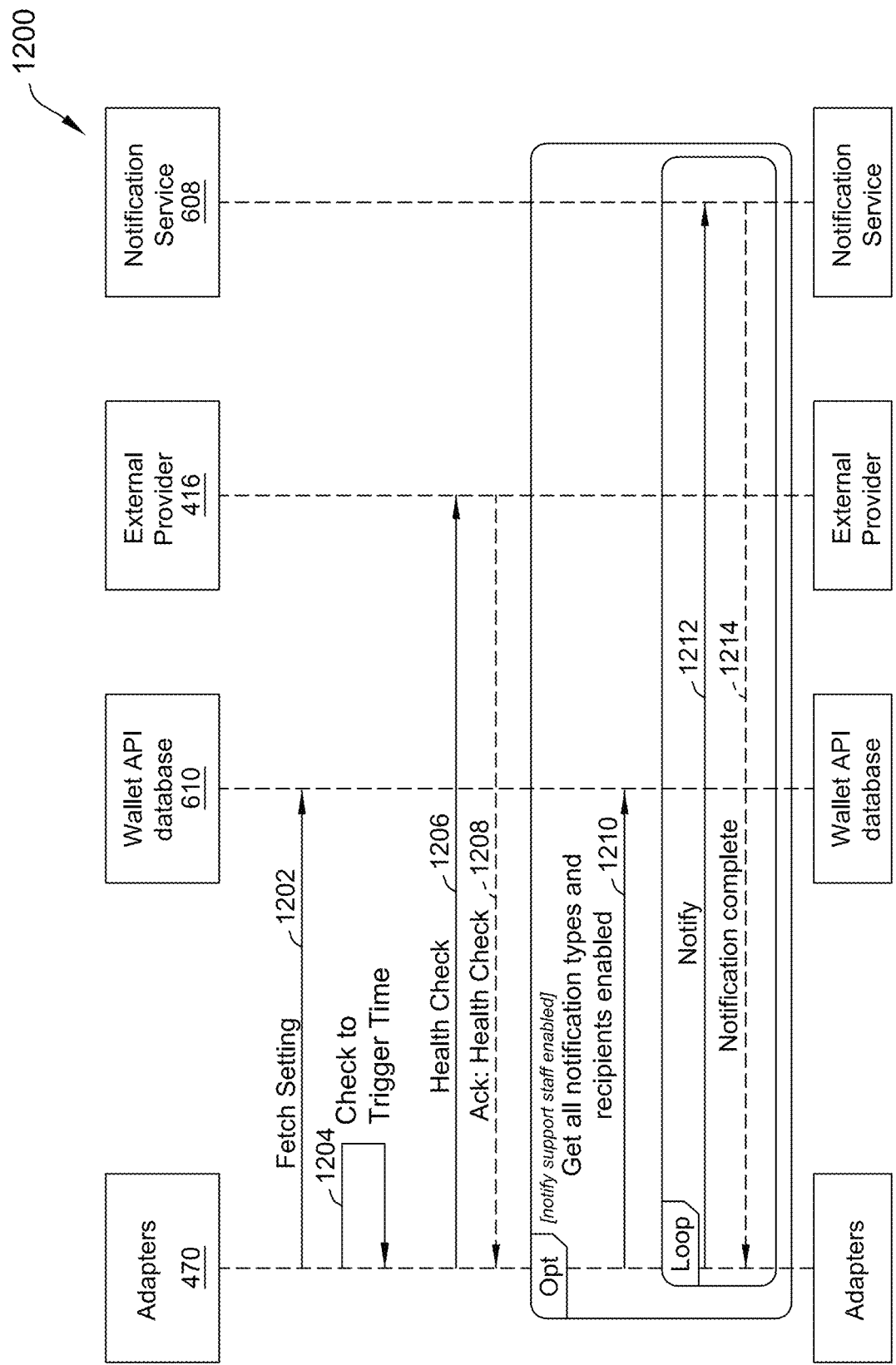
FIG. 12 illustrates an example external provider polling health check process that may be performed by the digital wallet systems shown in FIGS. 4A-6.

FIG. 12 illustrates an example external provider polling health check process 1200 that may be performed by the digital wallet systems 400, 500, 600 shown in FIGS. 4A-6. Process 1200 is performed via a plurality of devices, services, providers, etc. such as adapters 470, wallet database 610, external provider server 416, and notification service 608.

Adapters 470 may request 1202 settings from database 610 and check 1204 a trigger time for the health check (e.g., included in settings received from database 610). Adapters 470 may the cause a health check to be performed by transmitting 1206 a health check message to server 416 (e.g., to ensure that the external provider server 416 is performing/operating properly). Server 416 then acknowledges the health check and transmits 1208 health check results to adapters 470 (e.g., indicating positive or negative results of the health check). Accordingly, when adapters 470 determine support staff, as an example, associated with mobile devices who have notifications regarding health checks enabled, adapters 470 determine which notification types should be transmitted to the support staff (e.g., by querying 1210 database 610), and generates and transmits 1212 one or more messages to notification service 608 (e.g., to facilitate/control notifications sent to the mobile devices of the staff indicating the results of the health check). Service 608 then generates and transmits 1214 one or more notification complete messages to adapters 470 when the notifications have been sent to the staff (e.g., via mobile devices).

Certain aspects and embodiments/processes implemented by at least one of the architectures described above are provided below.

In one aspect, a digital wallet computing system is described. The digital wallet computing system includes at least one processor in communication with a memory device storing instructions. The instructions, when executed, cause the at least one processor to establish wireless connectivity between a mobile device of a player and an electronic gaming device, the electronic gaming device including a device identifier, receive an initiation of a funds transfer request from the mobile device of the player, the funds transfer request identifying a funds transfer amount and an external player account of the player, and identify an operator identity of an operator based on the device identifier of the electronic gaming device. The instructions also cause the at least one processor to identify a player account of the player, the player account associated with the operator, perform a first withdrawal transaction moving the funds transfer amount from the electronic gaming device to the player account associated with the operator, and in response to the first withdrawal transaction, automatically perform a second withdrawal transaction moving the funds transfer amount from the player account associated with the operator to the external player account of the player.

In some embodiments, the instructions also cause the at least one processor to determine, in response to the initiation of a funds transfer request, that the player has stopped playing at the electronic gaming device, determine a remaining credit balance including an amount of credits remaining at the electronic gaming device, and cause the remaining credit balance to be deposited as funds into the external player account.

In some embodiments, the instructions also cause the at least one processor to establish wireless connectivity between the mobile device of the player and a second electronic gaming device, the second electronic gaming device including a second device identifier, receive an initiation of a second funds transfer request from the mobile device of the player, the funds transfer request identifying a second funds transfer amount and the external player account of the player, and perform a third withdrawal transaction moving the second funds transfer amount from the external player account and causing a credit balance associated with the second funds transfer amount to be established at the second electronic gaming device identified by the second device identifier.

In some embodiments, the instructions also cause the at least one processor to determine a responsible gaming limit including a threshold amount of funds. In some embodiments, the instructions also cause the at least one processor to compare the second funds transfer amount to the threshold amount of funds. In some embodiments, the instructions also cause the at least one processor to, in response to determining that the funds transfer amount is less than the threshold amount of funds, perform the third withdrawal transaction. In some embodiments, the instructions also cause the at least one processor to determine a difference between an amount of funds withdrawn from the external player account, the amount of funds withdrawn including the second funds transfer amount, and an amount of funds deposited into the external player account over a predetermined period of time, and in response to determining that the difference satisfies the threshold amount of funds by not exceeding the responsible gaming limit, perform the third withdrawal transaction.

In another aspect, a computer-implemented method of providing digital wallet transactions implemented by a processor in communication with a memory device is described. The method includes establishing wireless connectivity between a mobile device of a player and an electronic gaming device, the electronic gaming device including a device identifier, receiving an initiation of a funds transfer request from the mobile device of the player, the funds transfer request identifying a funds transfer amount and an external player account of the player, and identifying an operator identity of an operator based on the device identifier of the electronic gaming device. The method also includes identifying a player account of the player, the player account associated with the operator, performing a first withdrawal transaction moving the funds transfer amount from the electronic gaming device to the player account associated with the operator, and in response to the first withdrawal transaction, automatically performing a second withdrawal transaction moving the funds transfer amount from the player account associated with the operator to the external player account of the player.

In some embodiments, the method also includes determining, in response to the initiation of a funds transfer request, that the player has stopped playing at the electronic gaming device, determining a remaining credit balance including an amount of credits remaining at the electronic gaming device, and causing the remaining credit balance to be deposited as funds into the external player account.

In some embodiments, the method also includes establishing wireless connectivity between the mobile device of the player and a second electronic gaming device, the second electronic gaming device including a second device identifier, receiving an initiation of a second funds transfer request from the mobile device of the player, the funds transfer request identifying a second funds transfer amount and the external player account of the player, and performing a third withdrawal transaction moving the second funds transfer amount from the external player account and causing a credit balance associated with the second funds transfer amount to be established at the second electronic gaming device identified by the second device identifier.

In some embodiments, the method also includes determining a responsible gaming limit including a threshold amount of funds. In some embodiments, the method also includes comparing the second funds transfer amount to the threshold amount of funds and, in response to determining that the funds transfer amount is less than the threshold amount of funds, performing the third withdrawal transaction. In some embodiments, the method also includes determining a difference between an amount of funds withdrawn from the external player account, the amount of funds withdrawn including the second funds transfer amount, and an amount of funds deposited into the external player account over a predetermined period of time and in response to determining that the difference satisfies the threshold amount of funds by not exceeding the responsible gaming limit, performing the third withdrawal transaction.

In another aspect, a non-transitory computer-readable medium storing instructions that, when executed by at least one processor, cause the at least one processor to establish wireless connectivity between a mobile device of a player and an electronic gaming device, the electronic gaming device including a device identifier, receive an initiation of a funds transfer request from the mobile device of the player, the funds transfer request identifying a funds transfer amount and an external player account of the player, and identify an operator identity of an operator based on the device identifier of the electronic gaming device. The instructions also cause the at least one processor to identify a player account of the player, the player account associated with the operator, perform a first withdrawal transaction moving the funds transfer amount from the electronic gaming device to the player account associated with the operator, and in response to the first withdrawal transaction, automatically perform a second withdrawal transaction moving the funds transfer amount from the player account associated with the operator to the external player account of the player.

In some embodiments, the instructions also cause the at least one processor to determine, in response to the initiation of a funds transfer request, that the player has stopped playing at the electronic gaming device, determine a remaining credit balance including an amount of credits remaining at the electronic gaming device, and cause the remaining credit balance to be deposited as funds into the external player account.

In some embodiments, the instructions also cause the at least one processor to establish wireless connectivity between the mobile device of the player and a second electronic gaming device, the second electronic gaming device including a second device identifier, receive an initiation of a second funds transfer request from the mobile device of the player, the funds transfer request identifying a second funds transfer amount and the external player account of the player, and perform a third withdrawal transaction moving the second funds transfer amount from the external player account and causing a credit balance associated with the second funds transfer amount to be established at the second electronic gaming device identified by the second device identifier.

In some embodiments, the instructions also cause the at least one processor to determine a responsible gaming limit including a threshold amount of funds. In some embodiments, the instructions also cause the at least one processor to compare the second funds transfer amount to the threshold amount of funds and in response to determining that the funds transfer amount is less than the threshold amount of funds, perform the third withdrawal transaction. In some embodiments, the instructions also cause the at least one processor to determine a difference between an amount of funds withdrawn from the external player account, the amount of funds withdrawn including the second funds transfer amount, and an amount of funds deposited into the external player account over a predetermined period of time and in response to determining that the difference satisfies the threshold amount of funds by not exceeding the responsible gaming limit, perform the third withdrawal transaction.

In another aspect a digital wallet computer system for gaming devices is described. The digital wallet computer system includes a messaging application programming interface (API) configured to receive funds transfer messages in a first message format, a message queue configured to receive funds transfer messages from the messaging API in a second message format, and at least one processor storing instructions. The instructions, when executed, cause the at least one processor to receive, by the messaging API from a server that manages electronic gaming sessions at a plurality of electronic gaming devices, a first funds transfer message in response to a player initiating a funds transfer request an electronic gaming device of the plurality of electronic gaming devices and convert, by the messaging API, the first funds transfer message from the first message format to the second message format. The instructions also cause the at least one processor to transmit the first funds transfer message to a digital wallet server and in response to the first funds transfer message being transmitted to the digital wallet server, automatically cause a funds amount associated with the first funds transfer message to be deposited in an external player account of the player at an external provider server.

In some embodiments, the digital wallet computer system further includes an adapter configured to receive the first funds transfer message in the second message format and convert the first funds transfer message into a third message format, wherein the first funds transfer message is received by the digital wallet server in the third message format.

In some embodiments, the instructions further cause the at least one processor to determine, in response to the first funds transfer message being transmitted to the digital wallet server, that the player has stopped playing at the electronic gaming device, determine a remaining credit balance including an amount of credits remaining at the electronic gaming device, the remaining credit balance including the funds amount, cause the funds to be deposited into a player account of the player associated with an operator of the electronic gaming device, and in response to the funds amount being deposited into the player account of the player, automatically withdraw the funds amount from the player account and cause the funds amount to be deposited in the external player account of the player.

In some embodiments, the instructions further cause the at least one processor to determine that the player has left a gaming property associated with the plurality of electronic gaming devices and in response to determining that the player has left the gaming property associated with the plurality of electronic gaming devices, transmit, to the server, a request for the first funds transfer message.

In some embodiments, the instructions further cause the at least one processor to receive, by the messaging API from a second server that manages electronic gaming sessions at a second plurality of electronic gaming devices, a second funds transfer message in response to a player initiating a second funds transfer request a second electronic gaming device of the second plurality of electronic gaming devices, the second funds transfer request identifying a second funds amount and the external player account of the player and cause the second funds amount to be transferred from the external player account and deposited at the second electronic gaming device, causing a credit balance associated with the second funds amount to be established at the second electronic gaming device.

In some embodiments, the instructions further cause the at least one processor to determine a responsible gaming limit including a threshold amount of funds, compare the second funds amount to the threshold amount of funds, and in response to determining that the funds amount is less than the threshold amount of funds, cause the second funds amount to be transferred from the external player account and deposited at the second electronic gaming device.

In another aspect, a computer-implemented method for managing a digital wallet computer system is described. The method includes receiving, by a messaging application programming interface (API) configured to receive funds transfer messages in a first message format and from a server that manages electronic gaming sessions at a plurality of electronic gaming devices, a first funds transfer message in response to a player initiating a funds transfer request an electronic gaming device of the plurality of electronic gaming devices and converting, by the messaging API, the first funds transfer message from the first message format to a second message format. The method also includes transmitting the first funds transfer message to a digital wallet server configured to manage funds transfers and in response to the first funds transfer message being transmitted to the digital wallet server, automatically causing a funds amount associated with the first funds transfer message to be deposited in an external player account of the player at an external provider server.

In some embodiments of the method, an adapter is configured to receive the first funds transfer message in the second message format and convert the first funds transfer message into a third message format, wherein the first funds transfer message is received by the digital wallet server in the third message format.

In some embodiments, the method also includes determining, in response to the first funds transfer message being transmitted to the digital wallet server, that the player has stopped playing at the electronic gaming device, determining a remaining credit balance including an amount of credits remaining at the electronic gaming device, the remaining credit balance including the funds amount, causing the funds to be deposited into a player account of the player associated with an operator of the electronic gaming device, and in response to the funds amount being deposited into the player account of the player, automatically withdrawing the funds amount from the player account and cause the funds amount to be deposited in the external player account of the player.

In some embodiments, the method also includes determining that the player has left a gaming property associated with the plurality of electronic gaming devices and in response to determining that the player has left the gaming property associated with the plurality of electronic gaming devices, transmitting, to the server, a request for the first funds transfer message.

In some embodiments, the method also includes receiving, by the messaging API from a second server that manages electronic gaming sessions at a second plurality of electronic gaming devices, a second funds transfer message in response to a player initiating a second funds transfer request a second electronic gaming device of the second plurality of electronic gaming devices, the second funds transfer request identifying a second funds amount and the external player account of the player and causing the second funds amount to be transferred from the external player account and deposited at the second electronic gaming device, causing a credit balance associated with the second funds amount to be established at the second electronic gaming device.

In some embodiments, the method also includes determining a responsible gaming limit including a threshold amount of funds, comparing the second funds amount to the threshold amount of funds, and in response to determining that the funds amount is less than the threshold amount of funds, causing the second funds amount to be transferred from the external player account and deposited at the second electronic gaming device.

In another aspect, a non-transitory computer-readable medium including instructions stored thereon is described. The instructions, in response to execution by a processor, cause the processor to receive, by a messaging application programming interface (API) configured to receive funds transfer messages in a first message format and from a server that manages electronic gaming sessions at a plurality of electronic gaming devices, a first funds transfer message in response to a player initiating a funds transfer request an electronic gaming device of the plurality of electronic gaming devices and convert, by the messaging API, the first funds transfer message from the first message format to a second message format. The instructions also cause the processor to transmit the first funds transfer message to a digital wallet server configured to manage funds transfers and in response to the first funds transfer message being transmitted to the digital wallet server, automatically cause a funds amount associated with the first funds transfer message to be deposited in an external player account of the player at an external provider server.

In some embodiments, the instructions further cause the processor to determine, in response to the first funds transfer message being transmitted to the digital wallet server, that the player has stopped playing at the electronic gaming device, determine a remaining credit balance including an amount of credits remaining at the electronic gaming device, the remaining credit balance including the funds amount, cause the funds to be deposited into a player account of the player associated with an operator of the electronic gaming device, and in response to the funds amount being deposited into the player account of the player, automatically withdraw the funds amount from the player account and cause the funds amount to be deposited in the external player account of the player.

In some embodiments, the instructions further cause the processor to determine that the player has left a gaming property associated with the plurality of electronic gaming devices and in response to determining that the player has left the gaming property associated with the plurality of electronic gaming devices, transmit, to the server, a request for the first funds transfer message.

In some embodiments, the instructions further cause the processor to receive, by the messaging API from a second server that manages electronic gaming sessions at a second plurality of electronic gaming devices, a second funds transfer message in response to a player initiating a second funds transfer request a second electronic gaming device of the second plurality of electronic gaming devices, the second funds transfer request identifying a second funds amount and the external player account of the player and cause the second funds amount to be transferred from the external player account and deposited at the second electronic gaming device, causing a credit balance associated with the second funds amount to be established at the second electronic gaming device.

In some embodiments, the instructions further cause the processor to determine a responsible gaming limit including a threshold amount of funds, compare the second funds amount to the threshold amount of funds, and in response to determining that the funds amount is less than the threshold amount of funds, cause the second funds amount to be transferred from the external player account and deposited at the second electronic gaming device.

Figure 13:
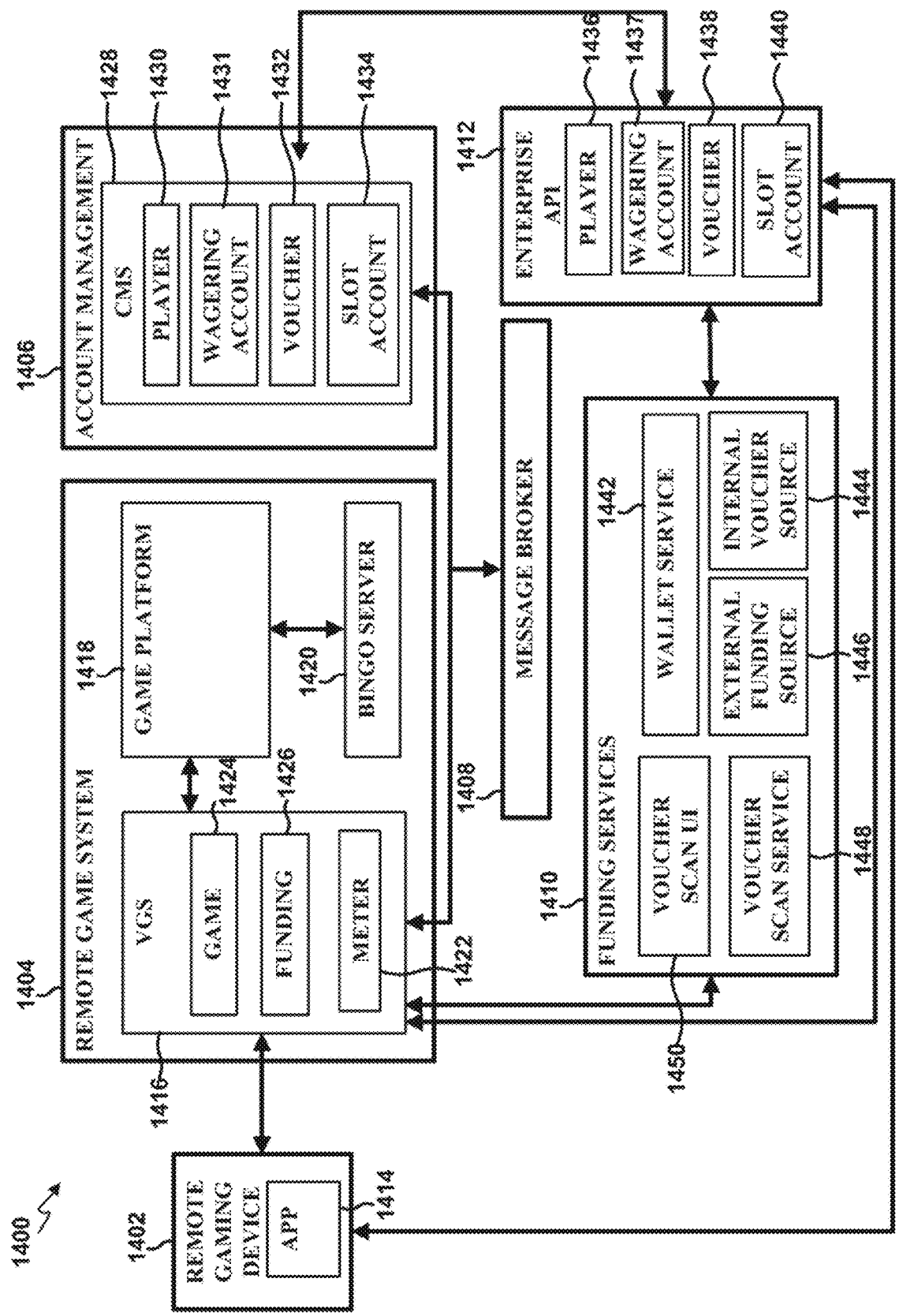
FIG. 13 is a block diagram of an implementation of a remote game play architecture that supports and funds remote game play with a prepaid game voucher.

FIG. 13 is a block diagram of an implementation of a remote game play architecture 1400 that supports and funds remote game play with a prepaid game voucher. The use and discussion of FIG. 13 is for exemplary purposes and is not intended to limit the disclosure to the specific remote game play architecture 1400 implementation. As an example, the remote game play architecture 1400 supports remote game play in a Class II wagering environment. The remote game play architecture 1400 could also be a framework that supports other game types, such as scratch tickets and iLottery. Specifically, although FIG. 13 illustrates that the remote game system 1404 includes a bingo server 1420, the remote game system 1404 could more generally utilize a central determination gaming system to support not only Class II bingo, but other game types such as scratch tickets and iLottery. In another example, rather than having the bingo server 1420 be part of the remote game system 1404, the bingo server 1420 could be external to the remote game system 1404. In particular, the bingo server 1420 could be part of a central determination gaming system server 106 shown in FIGS. 1 and 2. With reference to FIG. 3, the remote gaming device 1402 shown in FIG. 13 could correspond to UI system 302, and remote game system 1404 corresponds to game processing backend system 314. In other words, the remote game system 1404 can include and/or implement functionality relating to one or more components shown in FIG. 2's gaming device 200, such as RNG 212.

In FIG. 13, the remote game play architecture 1400 includes a remote gaming device 1402 with an app 1414. The remote gaming device 1402 shown in FIG. 13 can be a mobile gaming device 256 shown in FIG. 2B and/or an EUD 264 shown in FIG. 2C. For example, the remote gaming device 1402 could be a smart phone, a tablet, a laptop computer, a personal computer, and/or a special purpose device configured for remote game play. The app 1414 is executable software and/or code made available by downloading the software from a remote host, such as an online app store, website, shared folder, or other remote data site (e.g., from a gaming data center 276). App 1414 may be a custom app specifically designed for remote game play or part of a more generalized app that includes functionality for remote game play with real money wagering. As an example, app 1414 could be a loyalty app that includes not only remote game play with real money wagering, but other casino-related features and functions, such as tracking loyalty points, comps, and digital gaming wallet balances. In another example, app 1414 is a gaming app customized for remote game play and does not provide other casino-related functionality.

In one or more implementations, to comply with regulations and/or other third-party policies, the remote host (not shown in FIG. 13) restricts when the remote gaming device 1402 can download the app 1414 according to the location of the remote gaming device. For example, before a remote host authorizes a remote gaming device 1402 to download app 1414, the remote host receives location information of the remote gaming device 1402 and checks whether the remote gaming device 1402 is located in one or more designated geographical zones (e.g., within a wager-enabled zone or jurisdiction). If the remote host determines that the device is located within an appropriate geographical zone, the remote host permits downloading app 1414 to remote gaming device 1402. After installing app 1414, for remote gaming device 1402 to run app 1414 or enable remote game play functionality within app 1414, the remote gaming device 1402 checks and verifies that the remote gaming device 1402 is within one or more designated remote gaming zones. If the app 1414 determines that the remote gaming device 1402 is not within the designated remote gaming zone, the app 1414 fails to run and/or disables the remote gaming functionality. The remote gaming zones could include designated gaming zones the permits wagering activity and playing wagering games and other venue or jurisdictional zones outside the designated gaming zones. The other venue or jurisdictional zones could correspond to zones that typically do not permit in-person wagering activities and/or playing wagering games. Examples of these venue or jurisdictional zones include casino hotel rooms, dining areas, retail, recreational facilities (e.g., swimming pool) and other on-site casino locations. The designated geographical zones to download app 1414 can include the remote gaming zones and/or other areas outside the remote gaming zones.

Figure 14:
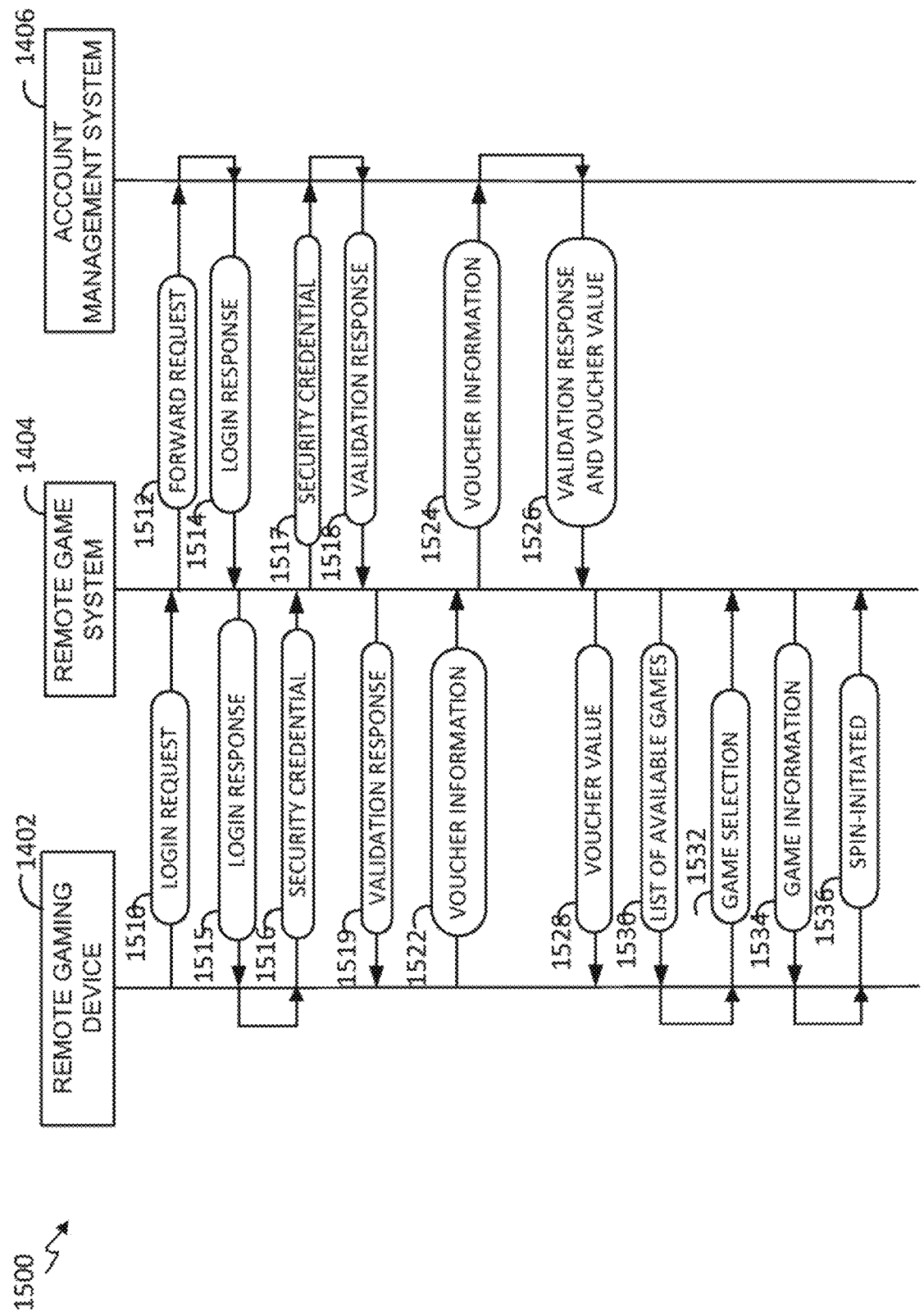
FIG. 14 is a protocol diagram that depicts a protocol sequence for logging in, funding a game session with a prepaid game voucher, and selecting a game for remote game play.

With reference to FIG. 3, the remote gaming device 1402 shown in FIG. 14 corresponds to UI system 302. As such, when app 1414 loads and runs on remote gaming device 1402, the remote gaming device 1402 is unable to generate random based game outcomes for a wagering game. Using FIG. 3 as an example, remote gaming device 1402 may not include a gaming RNG 318 that securely produces random numbers for determining random based game outcomes. Instead, the app 1414 may store and/or load UI elements and other visual assets to present the results (e.g., payout amount) after the remote game system 1404 determines the random based game outcome. The remote gaming device 1402 may receive the presentation information directly from remote game system 1404 or relevant presentation information (e.g., RNG seeds and/or credit values) to derive how to present the results to a player. In one or more implementations, to derive how to present game outcomes received from the remote game system 1404, the app 1414 could include a non-gaming RNG that performs similar functionality as non-gaming RNG 319A shown in FIG. 3. For example, remote game system 1404 may provide credit values determined from the games outcomes to the remote game device 1402. Based on the credit values, the remote game device 1402 may utilize the non-gaming RNG to randomly determine how to present the credit values.

Referring to FIG. 3 again, remote game system 1404 could correspond to game processing backend system 314. In one or more implementations, remote game system 1404 can be physically located in a designated gaming zone and/or other zones defined for wagering game play. Alternatively, remote game system 1404 can be physically located outside the designated gaming zone depending on regulations. To perform operations associated with the game processing backend system 314, the remote game system 1404 includes and/or provides a virtual gaming service 1416 that manages the game session for the remote gaming device. In one or more implementations, the virtual gaming service 1416 could be or is part of a virtual machine, virtual container, or other virtual computing resource allocated within remote game system 1404. Additionally, or alternatively, virtual gaming service 1416 could be or is part of a workstation, server, and/or other physical computing resource. In FIG. 13, the virtual gaming service includes a game module 1424 that performs, facilitates, and manages game processing operations to generate the random based game outcomes. For example, when the remote gaming device 1402 receives one or more player inputs, the remote gaming device 1402 generates and sends over one or more RNG and/or game initiation calls to remote game system 1404. Virtual gaming service 1416 processes the RNG and/or game initiation calls by communicating with game platform 1418, generating random numbers used to generate one or more random based game outcomes (e.g., generating bingo cards), and evaluating relevant game patterns (e.g., bingo patterns with a ball call) to determine payout amounts.

FIG. 13 also illustrates that the virtual gaming service 1416 includes a funding module 1426 and a meter module 1422. The funding module 1426 supports and/or facilitates fund transactions, such as transactions relating to the prepaid game voucher and/or transactions associated with a digital wallet. Regarding utilizing prepaid game vouchers, funding module 1426 stores relevant prepaid game voucher information (e.g., voucher value and identification information) for a game session and/or communicates prepaid game voucher information with other systems. In one or more implementations, the funding module 1426 is also setup to store and associate player identifying information, remote gaming device information, geolocation information, and/or date and time information along with the prepaid game voucher information. Meter module 1422 tracks wager and other credit metering information throughout the gaming session. Specifically, the meter module 1422 performs functions that typical hardware meters or other meters within an EGM perform to ensure regulatory compliance and monitor player credit balance. As an example, meter module 1422 can record the total amount of money wagered on the gaming device, total amount of money deposited, total amount of money withdrawn, total amount of winnings on the EGM. In FIG. 13, meter information is shared between the virtual gaming service 1416 and account management system 1406 using a message broker 1408. The message broker 1408 is a system that manages a variety of events, such as card-in events and/or fund transfer events.

As shown in FIG. 13, the virtual gaming service 1416 also includes a game platform 1418 and bingo server 1420. In a Class II environment, the game platform 1418 is setup to initiate and manage virtual gaming services entering and leaving one or more bingo game sessions. Over a period of game play, a virtual gaming service 1416 could enter numerous bingo game sessions. For each bingo game session, the game platform 1418 communicates with bingo server 1420 to obtain a ball call and passes the information to the appropriate virtual gaming services 1416. After receiving the ball call information, virtual gaming services 1416 compares and evaluates the ball call to one or more bingo cards. The virtual gaming service 1416 and/or the bingo server 1420 could generate, provide, and/or select the bingo cards.

The funding module 1426 in virtual gaming service 1416 communicates with funding services 1410 to initiate the transfer of funds for use in a game session with the remote gaming device 1402. In FIG. 13, the funding services 1410 represents one or more systems (e.g., financial provider and/or broker systems) used to verify, authenticate, and transfer funds to and/or from external funding source 1446 and internal voucher source 1444. The funding services 1410 includes a voucher scan UI 1450 and a voucher scan service 1448 to view, scan, digitize and store prepaid game voucher information and/or other relevant information. Voucher scan service 1448 also provides voucher information to a wallet service 1442, which acts as a financial transaction broker. The wallet service 1442 can broker funding transactions amongst the internal voucher source 1444, external funding source 1446, and/or other funding accounts. Internal voucher source 1444 represents an internally managed system that store, tracks, and manage funds for voucher account system 1432. The internal voucher source 1444 receives prepaid game voucher information from wallet service 1442 and sends relevant prepaid game voucher information and associated funds via enterprise API 1412 to account management system 1406. The external funding source 1446 could include third-party financial provider and/or institution systems (e.g., banks) and/or other gaming systems (e.g., other casino venues managed by a specific casino company or amongst different casino companies) that manage other accounts for a player external to the remote game play architecture 1400. For fund transfers relating to a digital wallet, the wallet service 1442 could initiate and/or verify a fund transfer from the external funding source 1446 to a player's wagering account. Specifically, the wallet service 1442 sends fund information via enterprise API 1412 to wagering account system 1431 within account management system 1406.

Although FIG. 13 illustrates that voucher scan UI 1450 and voucher scan service 1448 are part of funding services 1410, one or more operations of the voucher scan UI 1450 and a voucher scan service 1448 could be offloaded to other systems and/or other devices. For example, the voucher scan UI 1450 can be loaded as part of app 1414 to utilize remote gaming device 1402 to scan or capture an image of physical prepaid game vouchers. In another example, a kiosk that includes a voucher reader or optical scanner is loaded with the voucher scan UI 1450. The fund services 1410 and/or account management system 1406 could be setup to restrict the sale of physical prepaid game voucher to be within designated gaming zones and/or other wager-enabled zones prior to remote game play. Examples of other wager-enabled zones include restaurants, night-clubs, retail outlets, and other areas and/or businesses within casino venues. The wager-enabled zones, remote gaming zones, and designated gaming zones previously described could overlap in at least some of geographical areas. In other examples, the wager-enabled zones, remote gaming zones, and designated gaming zones could be completely separate with no overlapping geographical areas.

The enterprise API 1412 is an interface that communicates fund transaction information, gaming device information, and/or player account information amongst the remote gaming device 1402, the account management system 1406, the funding services 1410, and the remote game system 1404. The enterprise API 1412 facilitates communication between the different systems for a variety of different accounts and/or systems. FIG. 13 illustrates that enterprise API 1412 includes a player module 1436, wagering account module 1437, voucher module 1438, and slot account module 1440. The player module 1436, wagering account module 1437, voucher module 1438, and slot account module 1440 provide interfaces with the player tracking system 1430, wagering account system 1431, voucher account system 1432, and slot account system 1434 stored and managed by the central management system 1428. Player tracking system 1430 manages and tracks player and/or loyalty data at one or more casino venues venue. Wagering account system 1431 manages and tracks player funds accounts (e.g., digital gaming wallet) managed by the one or more casino venues, and voucher account system 1432 manages, issues, and tracks vouchers, such as authenticating existing prepaid game vouchers and issuing new prepaid game vouchers. Slot account system 1434 manages metering reporting, event logging, and bonusing and progressive jackpot features, resulting from game play for one or more virtual game services. To communicate relevant data, enterprise API 1412 may utilize a protocol, such as the Slot Accounting System (SAS) protocol or Game to System (G2S) protocol.

FIG. 14 is a protocol diagram that depicts a protocol sequence 1500 for logging in, funding a game session with a prepaid game voucher, and selecting a game for remote game play. Specifically, messages 1510-1519 correspond to exchanging data for login operations, messages 1522-1528 correspond to exchanging data for funding operations, and messages 1530-1536 corresponds to exchanging data for selecting a game for remote game play. With reference to FIG. 13, protocol sequence 1500 can be implemented using the remote game play architecture 1400. The use and discussion of FIG. 14 is only an example to facilitate explanation and is not intended to limit the disclosure to this specific example. Specifically, messages 1510-1536 do not necessarily need to perform in the order as depicted in FIG. 14. As an example, protocol sequence 1500 may communicate messages 1522-1528 after communicating messages 1530-1536. Additionally, or alternatively, for ease of explanation, protocol sequence 1500 does not include messages communicated with other systems, such as funding services 1410.

To start login process to an app and/or functionality within app, protocol sequence 1500 starts with transmitting a login request 1510 from remote gaming device 1402. In one or more implementations, the login request 1510 includes player information, such as loyalty card information, entered and/or stored in the remote gaming device 1402. In FIG. 14, the remote game system 1404 forwards the player information within the forward request 1512 to the account management system 1406. When the account management system 1406 receives the forward request 1512, the account management system 1406 processes the player information. Using FIG. 13 as an example, the account management system 1406 processes the player information with player tracking system 1430 and subsequently transmits a login response based on processing the player information. In one or more implementations, the login response includes a challenge or some other type of security credential request to verify and authenticate the remote gaming device's 1402 login request. The remote game system 1404 receives the login response 1514 and forwards the login response 1515 to remote gaming device 1402. Based on the login response 1515, the remote gaming device 1402 obtains and sends security credential 1516 to remote game system 1404, which then forwards security credential 1517 to account management system 1406. The account management system 1406 evaluates security credential 1517 to verify and authenticate the remote gaming device 1402. The account management system 1406 then sends a validation response 1518 that can either approve or deny the login request 1510. The remote game system 1404 receives the validation response 1518 and forwards the validation response 1519 to remote gaming device 1402.

After remote gaming device 1402 logins into the app, the remote gaming device may scan or capture an image of the prepaid gaming voucher. After remote gaming device 1402 scans or captures an image of the prepaid gaming voucher, the remote gaming device 1402 sends the voucher information 1522 (e.g., image of the prepaid gaming voucher) to the remote game system 1404. The remote game system 1404 stores the voucher information 1522 received from the remote game system 1404 and forwards voucher information 1524 to the account management system 1406. The account management system 1406 receives the voucher information 1524 and authenticates the prepaid gaming voucher and determines a voucher value. Recall that the account management system 1406 and/or funding services 1410 could have previously issued a corresponding prepaid gaming voucher within a wager-enabled zone. During the authentication process, account management system 1406 verifies and authenticates the issued prepaid gaming voucher with the received voucher information 1524. Voucher information 1524 could include the prepaid game voucher identifier information, remote gaming device information, geo-location information, and/or date and time information. Once account management system 1406 completes the authentication operation, the account management system 1406 sends a validation response and voucher value 1526 to the remote game system 1404. The remote game system 1404 receives the message from the account management system 1406 and in response provides the voucher value 1528 to the remote gaming device.

FIG. 14 also illustrates that after remote gaming device 1402 logins into the app, the remote game system 1404 provides a list of available games to the remote gaming device 1402. When the remote gaming device 1402 receives the list of available games, the remote gaming device 1402 may present the list of available games in a UI (e.g., a UI presented in app 1414 shown in FIG. 13) to a player. In one or more implementations, the UI could present a virtual lobby similar to a casino floor that a player could navigate through to find an appropriate game. Within the virtual lobby, the remote gaming device 1402 receives one or more player inputs to select a game from the available games. Based on the selected game, the remote game system 1404 sends game selection message 1532 to the remote game system 1404. The remote game system 1404 then sends game related information 1534 back to remote gaming device 1402. Based on the game related information 1534, the remote gaming device 1402 can build out and load the remote game to present in a UI. The remote gaming device 1402 may then receive one or more player inputs to initiate a spin for the remote game. Remote gaming device 1402 sends spin-initiated message 1536 to remote game system 1404 for processing. As previously discussed, remote game system 1404 performs one or more RNG calls and/or communicates with another system (e.g., a bingo server) to determine random based game outcomes for the spin-initiated message 1536.

Figure 15:
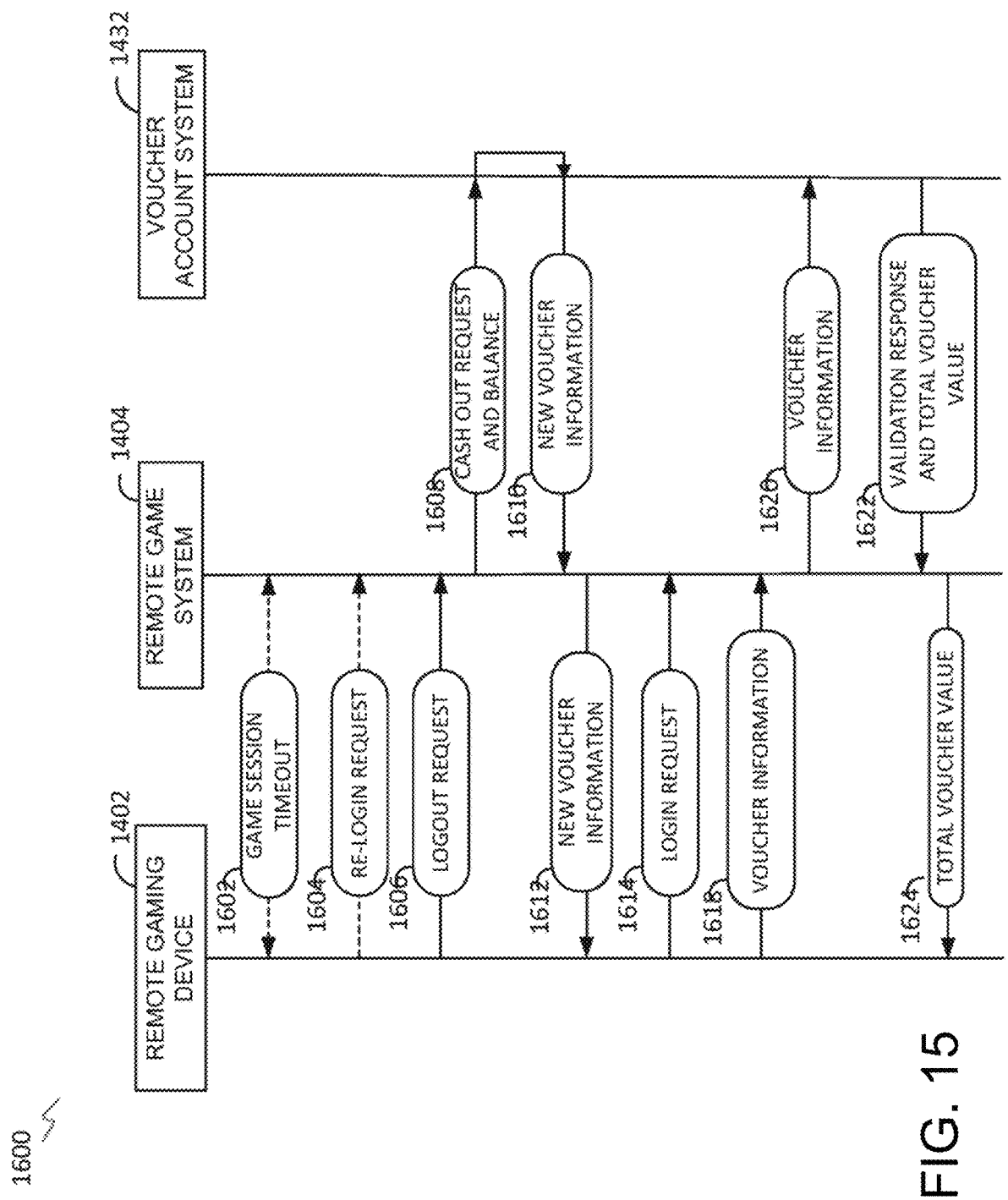
FIG. 15 is a protocol diagram illustrating a protocol sequence for ending and/or logging out of a game session when funding remote game play with a prepaid game voucher.

FIG. 15 is a protocol diagram illustrating a protocol sequence 1600 for ending and/or logging out of a game session when funding remote game play with a prepaid game voucher. In particular, the protocol sequence 1600 illustrates how remote game play architecture 1400 shown in FIG. 13 manages fund transactions for unexpected terminations and explicit logouts of a game session. Using FIG. 13 as an example, during remote game play, the established game session between the remote gaming device 1402 and the remote game system 1404 may terminate without the remote gaming device 1402 providing explicit instructions to end the game session with the remote game system 1404. These unexpected terminations of the game session could occur from a variety reasons, such as execution errors that causes app 1414 to crash, loss of network connection, loss of power for the remote gaming device 1402, and/or the remote gaming device 1402 moves outside the remote gaming zones. Similar to EGMs located on a casino floor, the virtual gaming service 1416 acts as a state machine and saves the current state of the gaming session. By saving the current state of the gaming session, the virtual gaming service 1416 can return to the last saved state prior to the unexpected termination of the game session.

The protocol sequence 1600 shown in FIG. 15 starts with an unexpected termination of a game session. When a game session unexpectedly terminates, a game session timeout 1602 occurs between remote gaming device 1402 and remote game system 1404. During the game session timeout 1602, remote gaming device 1402 and/or remote game system 1404 may attempt to exchange data or verify the network connection between each other. When the remote game system 1404 determines that an unexpected session terminates, rather than notifying voucher account system 1432 to issue a new voucher, the remote game system 1404 temporarily holds the fund within the gaming environment. In one or more implementations, to hold the funds within the gaming environment, remote game system 1404 holds off on notifying the voucher account system 1432 for a designated period. Using FIG. 13 as an example, the remote game system 1404 may send fund information only to the wagering account system 1431 or avoid sending fund information to the central management system 1428 altogether. If the remote game system 1404 is unable to re-establish the game session with remote gaming device 1402 within the designated period, the remote game system 1404 notifies the voucher account system 1432 to issue a new voucher. In one or more implementations, to notify the voucher account system 1432, the remote game system 1404 notifies the central management system 1428, which routes the notification to the voucher account system 1432.

In FIG. 15, the remote game system 1404 sends re-login request 1604 prior to the designated period expiring. Although not explicitly shown in FIG. 15, the protocol sequence 1600 could exchange messages between the remote gaming device 1402, remote game system 1404 and account management system 1406 (e.g., messages 1510-1519 in FIG. 14) to authenticate the re-login request 1604. Based on the re-login request 1604 and after authenticating the re-login request 1604, the remote game system 1404 reloads the funds that were available prior to the unexpected termination of the game session onto the meter. In one or more implementations, the remote game system 1404 could reload the funds based on the fund information temporarily stored on the remote game system 1404 (e.g., virtual gaming service 1416 in FIG. 13). In other implementations, the remote game system 1404 could receive the available funds from another system that previously saved and stored on the fund information (e.g., wagering account system 1431 shown in FIG. 13).

During an active game session, when the remote gaming device 1402 receives instructions from one or more player inputs to end a game session for remote game play, the remote gaming device 1402 sends a logout request 1606 to remote game system 1404. Remote game system 1404 receives logout request 1606 and generates and sends a cash out request and balance 1608 to the voucher account system 1432. The cash out request and balance 1608 includes the remaining game credits and/or monetary balance left on the meter when receiving the logout request 1606 from remote gaming device 1402. When voucher account system 1432 receives the cash out request and balance 1608, voucher account system 1432 generates and issues a new voucher based on the balance information. Voucher account system 1432 sends the new voucher information to remote game system 1404 and remote game system 1404 stores the monetary value. Afterwards, remote game system 1404 sends voucher information 1612 to remote gaming device 1402. When remote gaming device 1402 receives the voucher information 1612, the remote gaming device 1402 could present a digital voucher within app 1414.

After ending a game session by logging out, the remote gaming device 1402 may subsequently establish a new game session for remote game play. Although not shown in FIG. 15, the protocol sequence 1600 could exchange messages 1510-1519 to perform login operations. In FIG. 15, when remote gaming device 1402 establishes the new game session based on login request 1614, any additional prepaid gaming vouchers captured and stored into the remote gaming device 1402 is sent to remote game system 1404 via voucher information 1618. The voucher information 1618 may not include the digital voucher associated with voucher information 1612 since remote game system 1404 may have previously stored the voucher information during the cash out operation. The remote game system 1404 sends voucher information 1620, which includes the voucher information 1618 and the digital voucher associated with voucher information 1612, to voucher account system 1432. After voucher account system 1432 processes voucher information 1620, voucher account system 1432 sends a validation response and the total voucher value 1622 to the remote game system 1404. The remote game system 1404 loads game credits onto the meter based on the total voucher value 1622. The remote game system 1404 also sends the total voucher value 1624 to remote gaming device 1402.

Figure 16:
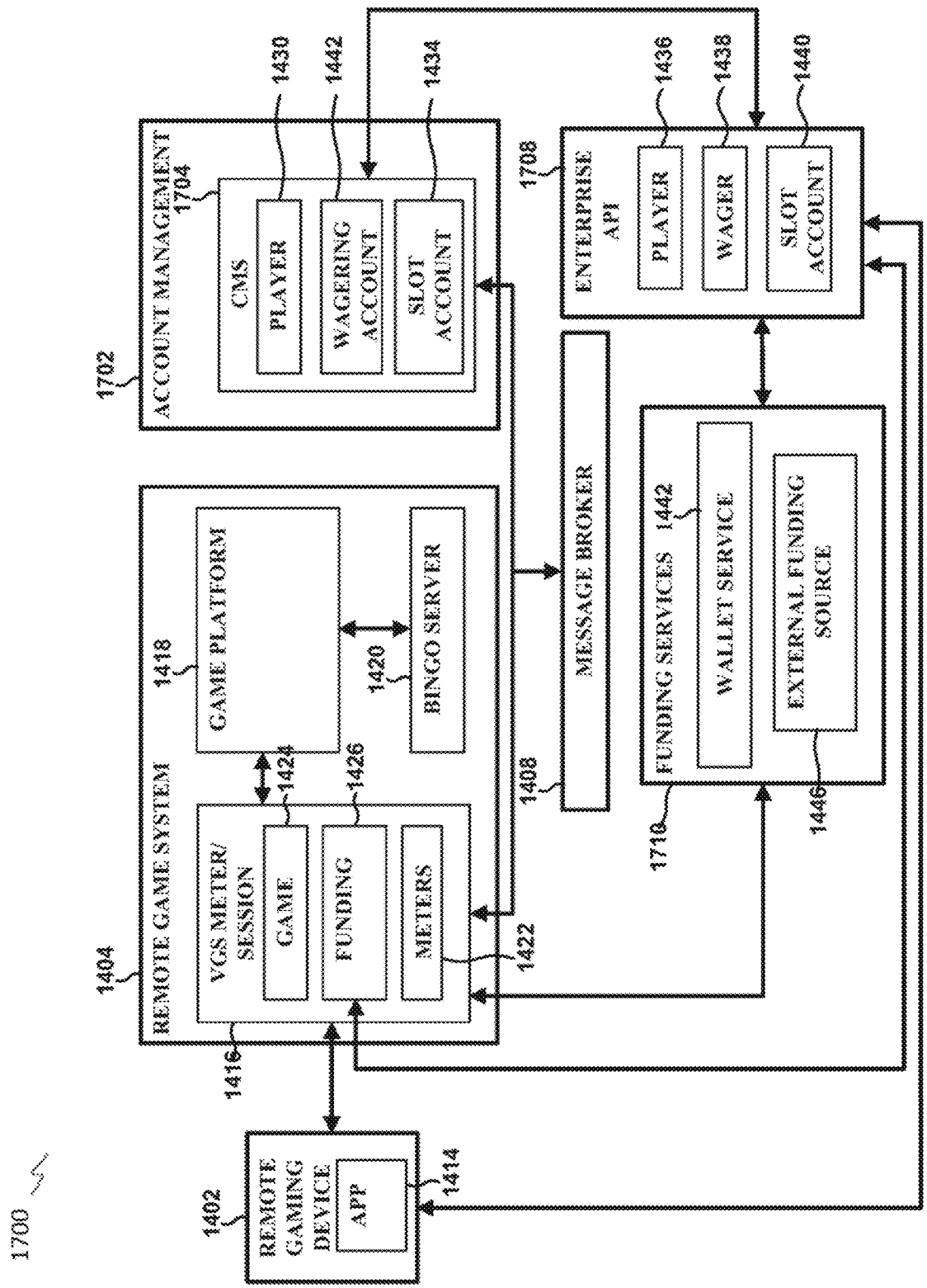
FIG. 16 is a block diagram of another implementation of a remote game play architecture that supports and funds remote game play using a digital gaming wallet.

FIG. 16 is a block diagram of another implementation of a remote game play architecture 1700 that supports and funds remote game play using a digital gaming wallet. Remote game play architecture 1700 is substantially similar to remote game play architecture 1400 implementation except that the funding services 1710, enterprise 1708, and account management system 1702 do not support the use of prepaid game vouchers purchased outside a designated gaming zone. Similar to the remote game play architecture 1400, remote game play architecture 1700 can support remote game play in Class II wagering games and other game types, such as scratch tickets and iLottery. Stated another way, remote game play architectures 1400 and 1700 support not only real-time remote game play, but also predetermined or future game outcomes.

Figure 17:
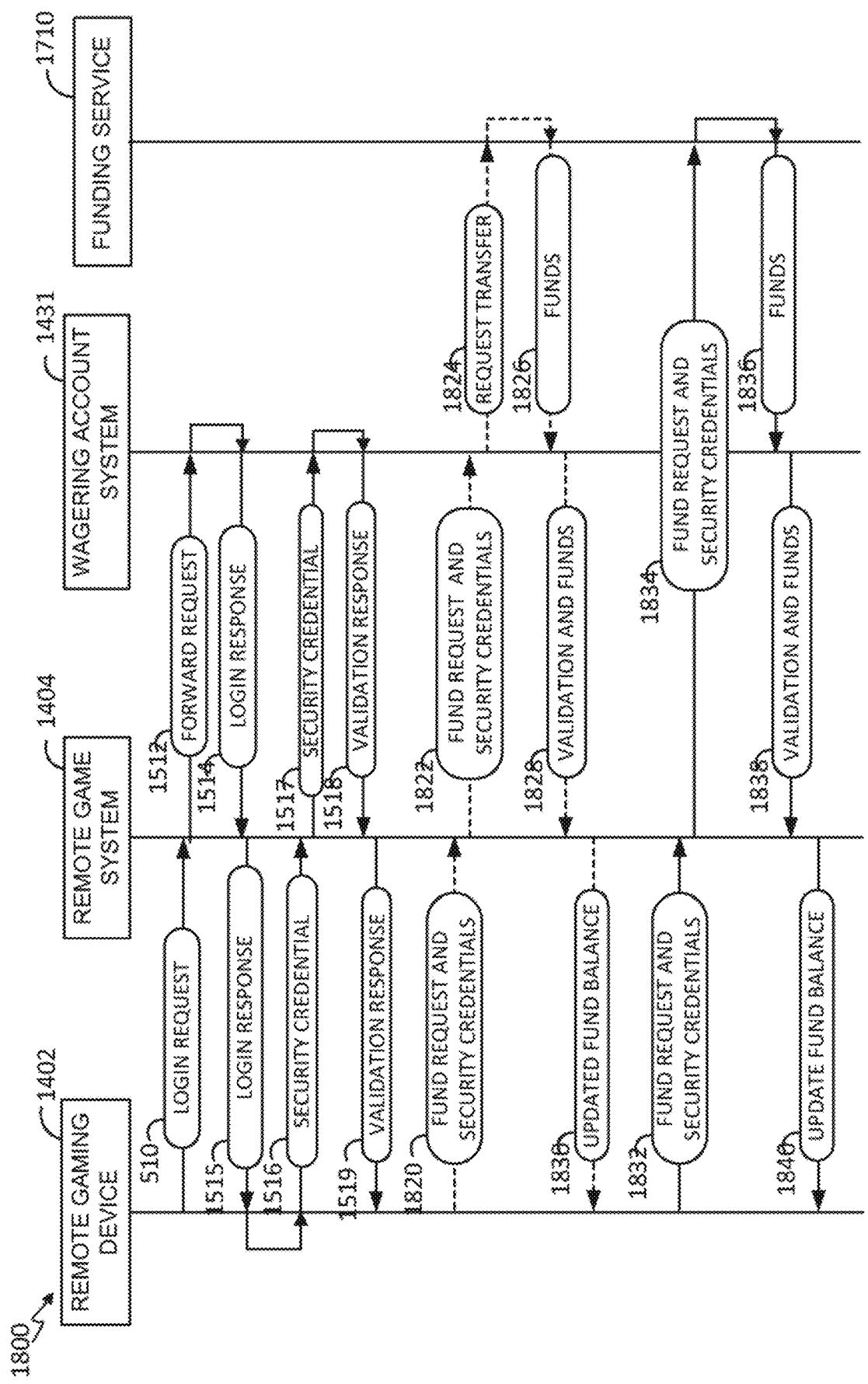
FIG. 17 is a protocol diagram that depicts a protocol sequence for logging in and funding a game session with a digital gaming wallet.

FIG. 17 is a protocol diagram that depicts a protocol sequence 1800 for logging in and funding a game session with a digital gaming wallet. Remote game play architectures 1400 or 1700 can implement protocol sequence 1800 to fund a digital gaming wallet managed by the wagering account system 1431. Protocol sequence 1800 includes two different funding operations that could be implemented within wagering account system 1431. One funding operation includes exchanging messages 1820-1830 and another funding operation includes exchanging messages 1832-1840. The use and discussion of FIG. 17 is only an example to facilitate explanation and is not intended to limit the disclosure to this specific example. As an example, remote game play architectures 1400 and 1700 could implement one of the funding operations while in another example, remote game play architectures 1400 and 1700 could implement both funding operations. Additionally, or alternatively, for ease of explanation, protocol sequence 1500 does not include messages communicated with other systems, such as funding services 1410.

FIG. 17 performs a login process that is substantially similar to the login process shown in FIG. 14. After remote gaming device 1402 logins into the app, the remote gaming device 1402 sends a fund request and security credentials to remote game system 1404. The fund request provides instructions to transfer funds from an external funding source to a digital gaming wallet account managed by the wagering account system 1431. When the remote game system 1404 receives the fund request and security credentials 1820, the remote game system 1404 processes the message and forwards the relevant information into fund request and security credentials 1822 to wagering account system 1431. In one or more implementations, the remote game system 1404 stores the fund information sent in the fund request and security credentials 1820. When the wagering account system 1431 receives fund request and security credentials 1822, the wagering account system 1431 authenticates the fund request and sends a fund request transfer 1824 to funding service 1710. The funding service 1710 verifies the fund request transfer 1824 and provides funds 1826 to wagering account system 1431 (e.g., a digital gaming wallet). The wagering account system 1431 can send a validation response and funds 1828 to remote game system 1404 for remote game play. The remote game system 1404 may then send an updated fund balance 1830 to remote gaming device 1402.

FIG. 17 also illustrates another funding operation that starts with the remote gaming device 1402 sending a fund request and security credentials to remote game system 1404. Rather than having remote game system 1404 send the fund request and security credentials 1834 to the wagering account system 1431, the remote game system 1404 sends the fund request and security credentials 1834 directly to the funding service 1710. The funding service 1710 verifies the fund request and security credentials 1834 and provides funds 1836 to wagering account system 1431 (e.g., a digital gaming wallet). The wagering account system 1431 can send a validation response and funds 1838 to remote game system 1404 for remote game play. The remote game system 1404 may then send an updated fund balance 1840 to remote gaming device 1402.

Figure 18:
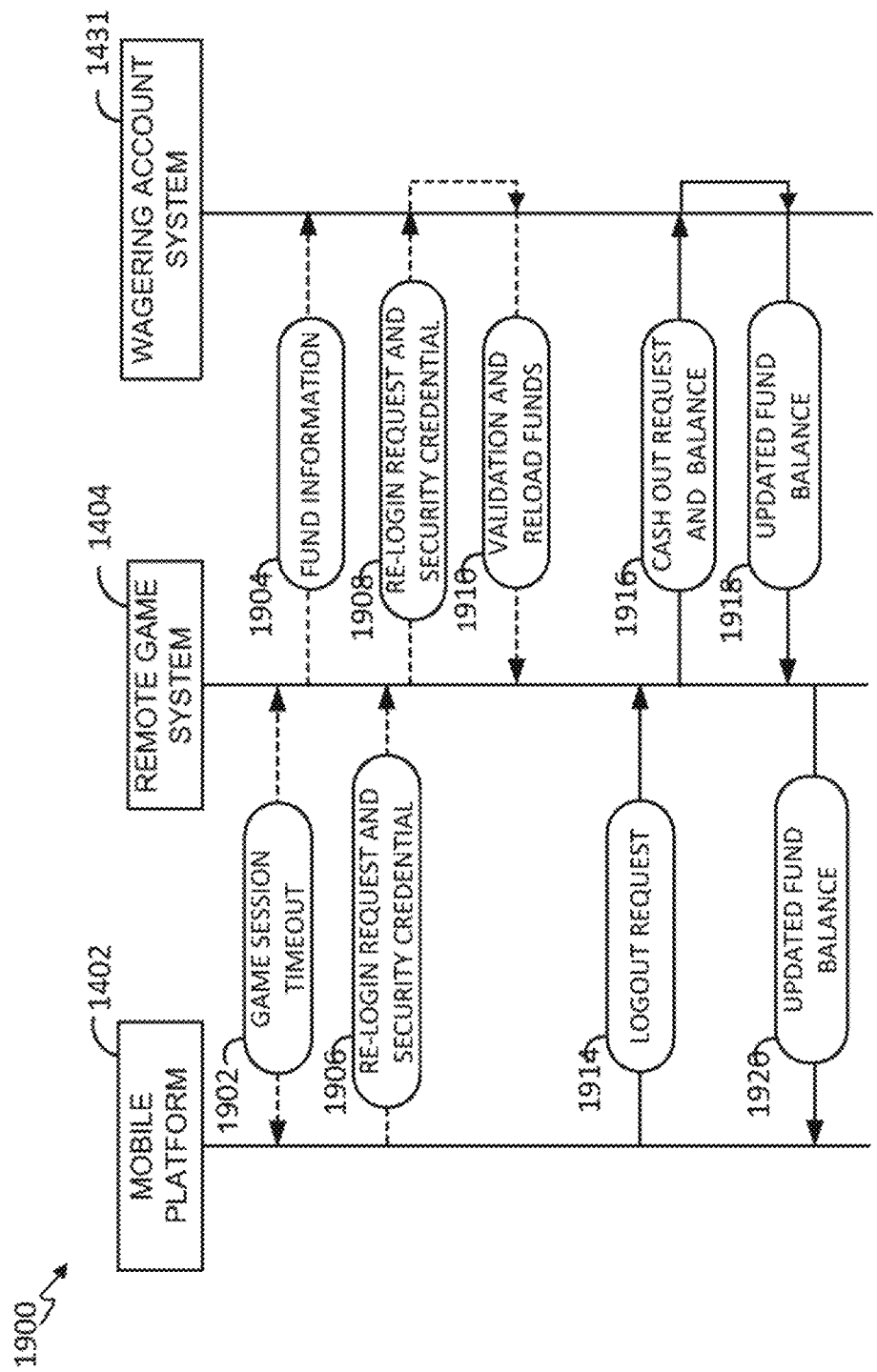
FIG. 18 is a protocol diagram illustrating a protocol sequence for ending and/or logging out of a game session when funding remote game play with a digital gaming wallet.

FIG. 18 is a protocol diagram illustrating a protocol sequence 1900 for ending and/or logging out of a game session when funding remote game play with a digital gaming wallet. In particular, the protocol sequence 1900 illustrates how remote game play architectures 1400 and 1700 shown in FIGS. 13 and 16 manage funding transactions for unexpected terminations and explicit logouts of a game session. Similar to FIG. 15, FIG. 18 illustrates an established game session between the remote gaming device 1402 and the remote game system 1404 that terminates without the remote gaming device 1402 providing explicit instructions to end the game session to the remote game system 1404. The protocol sequence 1900 shown in FIG. 18 starts with a game session timeout 1902 that is substantially similar to game session timeout 1602 shown in FIG. 15. When the remote game system 1404 determines that an unexpected session terminates, the remote game system 1404 temporarily holds the fund within the gaming environment. In one or more implementations, to maintain funds within the gaming environment, remote game system 1404 holds off on notifying the central management system 1428 for a designated period and stores fund information in the remote game system 1404. Additionally, or alternatively, as shown in FIG. 18, remote game system 1404 sends fund information to the wagering account system 1431 to temporarily store the balance in the digital gaming wallet and/or some other wallet. The wagering account system 1431 may indicate that the associated funds are pending or temporarily on hold, and thus may not be available for immediate use. If the remote game system 1404 is unable to re-establish the game session with remote gaming device 1402 within the designated period, the remote game system 1404 sends a cash out operation to the central management system 1428. After the cash out operation, the funds previously temporarily on hold are transferred to the digital gaming wallet for immediate use.

In FIG. 18, the remote game system 1404 sends re-login request 1904 prior to the designated period expiring. Although not explicitly shown in FIG. 18, the protocol sequence 1900 could exchange login messages between the remote gaming device 1402, remote game system 1404 and account management system 1406 (e.g., messages 1510-1519 in FIG. 17) to authenticate the re-login request 1904. Based on the re-login request 1604 and after authenticating and validating the re-login request 1904, the remote game system 1404 reloads the funds that were available prior to the unexpected termination of the game session onto the meter. In one or more implementations, the remote game system 1404 could reload the funds based on the fund information temporarily stored on the remote game system 1404 (e.g., virtual gaming service 1416 in FIG. 13). In other implementations and as shown in FIG. 18, the remote game system 1404 sends a re-login request and security credential 1908 to wagering account system 1431. When wagering account system 1431 receives the re-login request and security credential 1908, wagering account system 1431 processes the message and sends a validation and reload funds message 1910 back to the remote game system. Based on the validation and reload funds message 1910, the remote game system 1404 reloads the temporarily held funds onto the credit meter.

During an active game session, when the remote gaming device 1402 receives instructions from one or more player inputs to end a game session for remote game play, the remote gaming device 1402 sends a logout request 1914 to remote game system 1404. Remote game system 1404 receives logout request 1914 and generates and sends a cash out request and balance 1916 to the wagering account system 1431. The cash out request and balance 1916 includes the remaining game credits and/or monetary balance left on the meter when receiving the logout request 1914 from remote gaming device 1402. When wagering account system 1431 receives the cash out request and balance 1916, wagering account system 1431 stores and update the funds in a digital gaming wallet. Voucher account system 1432 sends the updated fund balance 1918 for the digital gaming wallet to remote game system 1404 and remote game system 1404 stores the fund information. Afterwards, remote game system 1404 sends updated fund balance 1920 for the digital gaming wallet to remote gaming device 1402. When remote gaming device 1402 receives the updated fund balance 1920, the remote gaming device 1402 could present the updated fund balance in the digital gaming wallet within app 1414.

The present disclosure is widely applicable to numerous implementations, as is readily apparent from the disclosure. One of ordinary skill in the art will recognize that the innovations described herein may be practiced with various modifications and alterations, such as structural, logical, software, and electrical modifications. Although particular features of the innovations described herein may be described with reference to one or more particular implementations and/or drawings, it should be understood that such features are not limited to usage in the one or more particular implementations or drawings with reference to which they are described, unless expressly specified otherwise.

The present disclosure is neither a literal description of all implementations nor a listing of features of the innovations described herein that must be present in all implementations.

The Title (set forth at the beginning of the first page of this disclosure) is not to be taken as limiting in any way as the scope of the disclosed implementations. Headings of sections provided in this disclosure are for convenience only and are not to be taken as limiting the disclosure in any way.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget"" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When introducing elements of aspects of the present disclosure or implementations thereof, the articles "a," "an," "the," and "said" are intended to mean that there are one or more of the elements. The terms "comprising," including," and "having" are intended to be inclusive and mean that there may be additional elements other than the listed elements.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other implementations need not include the described device itself, but rather can include the one or more other devices which would, in those other implementations, have such functionality/features.

Further, the systems and methods described herein are not limited to the specific implementations described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Devices that are in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an implementation with several components or features does not imply that all or even any of such components and/or features are required. On the contrary, a variety of optional components are described to illustrate the wide variety of possible implementations of the innovations described herein. Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the innovations described herein, and does not imply that the illustrated process is preferred.

Although a process may be described as including a plurality of steps, that does not indicate that all or even any of the steps are essential or required. Various other implementations within the scope of the present disclosure include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other implementations within the scope of the present disclosure include other products that omit some or all of the described plurality. An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise.

For the sake of presentation, the detailed description uses terms like "determine" and "select" to describe computer operations in a computer system. These terms denote operations performed by a computer and should not be confused with acts performed by a human being. The actual computer operations corresponding to these terms vary depending on implementation. For example, "determining" something can be performed in a variety of manners, and therefore the term "determining" (and like terms) can indicate calculating, computing, deriving, looking up (e.g., in a table, database or data structure), ascertaining, recognizing, and the like.

As used herein, the term "send" denotes any way of conveying information from one component to another component, and the term "receive" denotes any way of getting information at one component from another component. The two components can be part of the same computer system or different computer systems. The information can be passed by value (e.g., as a parameter of a message or function call) or passed by reference (e.g., in a buffer). Depending on context, the information can be communicated directly between the two components or be conveyed through one or more intermediate components. As used herein, the term "connected" denotes an operable communication link between two components, which can be part of the same computer system or different computer systems. The operable communication link can be a wired or wireless network connection, which can be direct or pass through one or more intermediate components (e.g., of a network). Communication among computers and devices may be encrypted to ensure privacy and prevent fraud in any of a variety of ways well known in the art.

It will be readily apparent that the various methods and algorithms described herein may be implemented by, e.g., appropriately programmed general-purpose computers and computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some implementations, hard-wired circuitry or custom hardware may be used in place of, or in combination with, software instructions for implementation of the processes of various implementations. Thus, implementations are not limited to any specific combination of hardware and software. Accordingly, a description of a process likewise describes at least one apparatus for performing the process, and likewise describes at least one computer-readable medium for performing the process. The apparatus that performs the process can include components and devices (e.g., a processor, input and output devices) appropriate to perform the process. A computer-readable medium can store program elements appropriate to perform the method.

The term "computer-readable medium" refers to any non-transitory storage or memory that may store computer-executable instructions or other data in a computer system and be read by a processor in the computer system. A computer-readable medium may take many forms, including but not limited to nonvolatile storage or memory (such as optical or magnetic disk media, a solid-state drive, a flash drive, PROM, EPROM, and other persistent memory) and volatile memory (such as DRAM). The term "computer-readable media" excludes signals, waves, and wave forms or other intangible or transitory media that may nevertheless be readable by a computer.

The present disclosure provides, to one of ordinary skill in the art, an enabling description of several implementations and/or innovations. Some of these implementations and/or innovations may not be claimed in the present application but may nevertheless be claimed in one or more continuing applications that claim the benefit of priority of the present application. Applicants may file additional applications to pursue patents for subject matter that has been disclosed and enabled but not claimed in the present application.

The foregoing description discloses only exemplary implementations of the present disclosure. Modifications of the above disclosed apparatus and methods which fall within the scope of the present disclosure will be readily apparent to those of ordinary skill in the art. For example, although the examples discussed above are illustrated for a gaming market, implementations of the present disclosure can be implemented for other markets. The gaming system environment of the examples is not intended to suggest any limitation as to the scope of use or functionality of any aspect of the disclosure.

While the invention has been described with respect to the figures, it will be appreciated that many modifications and changes may be made by those skilled in the art without departing from the spirit of the invention. Any variation and derivation from the above description and figures are included in the scope of the present invention as defined by the claims. In view of the many possible implementations to which the principles of the disclosed invention may be applied, it should be recognized that the illustrated implementations are only preferred examples of the invention and should not be taken as limiting the scope of the invention. Rather, the scope of the invention is defined by the following claims. We therefore claim as our invention all that comes within the scope and spirit of these claims.

What is claimed is:

1. A digital wallet computer system for gaming devices, the digital wallet computer system comprising:
    a messaging application programming interface (API) configured to receive funds transfer messages in a first message format;
    a message queue configured to receive funds transfer messages from the messaging API in a second message format; and
    at least one processor storing instructions that, when executed, cause the at least one processor to:
        receive a first funds transfer message based on a player initiating a funds transfer request at an electronic gaming device of a plurality of electronic gaming devices, wherein the first funds transfer message is associated with a credit balance of an amount of credits usable by the player to play an electronic game at the electronic gaming device, and wherein the first funds transfer message is received by the messaging API from a server that manages electronic gaming sessions at the plurality of electronic gaming devices;
        convert, by the messaging API, the first funds transfer message from the first message format to the second message format;
        transmit the first funds transfer message to a digital wallet server; and
        in response to the first funds transfer message being transmitted to the digital wallet server, automatically cause a funds amount associated with the credit balance to be deposited in an external player account of the player at an external provider server.

2. The digital wallet computer system of claim 1 further comprising:
    an adapter configured to receive the first funds transfer message in the second message format and convert the first funds transfer message into a third message format, wherein the first funds transfer message is received by the digital wallet server in the third message format.

3. The digital wallet computer system of claim 1, wherein the instructions further cause the at least one processor to:
    determine, in response to the first funds transfer message being transmitted to the digital wallet server, that the player has stopped playing at the electronic gaming device;
    determine a remaining credit balance comprising the amount of credits, the remaining credit balance comprising the funds amount;
    cause the funds amount to be deposited into a player account of the player associated with an operator of the electronic gaming device; and
    in response to the funds amount being deposited into the player account of the player, automatically withdraw the funds amount from the player account and cause the funds amount to be deposited in the external player account of the player.

4. The digital wallet computer system of claim 1, wherein the instructions further cause the at least one processor to:
determine that the player has left a gaming property associated with the plurality of electronic gaming devices; and
in response to determining that the player has left the gaming property associated with the plurality of electronic gaming devices, transmit, to the server, a request for the first funds transfer message.

5. The digital wallet computer system of claim 1, wherein the instructions further cause the at least one processor to:
receive, by the messaging API from a second server that manages electronic gaming sessions at a second plurality of electronic gaming devices, a second funds transfer message in response to the player initiating a second funds transfer request a second electronic gaming device of the second plurality of electronic gaming devices, the second funds transfer request identifying a second funds amount and the external player account of the player; and
cause the second funds amount to be transferred from the external player account and deposited at the second electronic gaming device, causing a credit balance associated with the second funds amount to be established at the second electronic gaming device.

6. The digital wallet computer system of claim 5, wherein the instructions further cause the at least one processor to determine a responsible gaming limit comprising a threshold amount of funds.

7. The digital wallet computer system of claim 6, wherein the instructions further case the at least one processor to:
compare the second funds amount to the threshold amount of funds; and
in response to determining that the funds amount is less than the threshold amount of funds, cause the second funds amount to be transferred from the external player account and deposited at the second electronic gaming device.

8. A computer-implemented method for managing a digital wallet computer system, the method comprising:
receiving, by a messaging application programming interface (API) and from a server, a first funds transfer message based on a player initiating a funds transfer request at an electronic gaming device of a plurality of electronic gaming devices, wherein the first funds transfer message is associated with a credit balance of an amount of credits usable by the player to play an electronic game at the electronic gaming device, and wherein the messaging API is configured to receive funds transfer messages in a first message format and from the server that manages electronic gaming sessions at the plurality of electronic gaming devices;
converting, by the messaging API, the first funds transfer message from the first message format to a second message format;
transmitting the first funds transfer message to a digital wallet server configured to manage funds transfers; and
in response to the first funds transfer message being transmitted to the digital wallet server, automatically causing a funds amount associated with the credit balance to be deposited in an external player account of the player at an external provider server.

9. The method of claim 8, wherein an adapter is configured to receive the first funds transfer message in the second message format and convert the first funds transfer message into a third message format, wherein the first funds transfer message is received by the digital wallet server in the third message format.

10. The method of claim 8, further comprising:
determining, in response to the first funds transfer message being transmitted to the digital wallet server, that the player has stopped playing at the electronic gaming device;
determining a remaining credit balance comprising the amount of credits, the remaining credit balance comprising the funds amount;
causing the funds to be deposited into a player account of the player associated with an operator of the electronic gaming device; and
in response to the funds amount being deposited into the player account of the player, automatically withdrawing the funds amount from the player account and cause the funds amount to be deposited in the external player account of the player.

11. The method of claim 8, further comprising:
determining that the player has left a gaming property associated with the plurality of electronic gaming devices; and
in response to determining that the player has left the gaming property associated with the plurality of electronic gaming devices, transmitting, to the server, a request for the first funds transfer message.

12. The method of claim 8, further comprising:
receiving, by the messaging API from a second server that manages electronic gaming sessions at a second plurality of electronic gaming devices, a second funds transfer message in response to the player initiating a second funds transfer request a second electronic gaming device of the second plurality of electronic gaming devices, the second funds transfer request identifying a second funds amount and the external player account of the player; and
causing the second funds amount to be transferred from the external player account and deposited at the second electronic gaming device, causing a credit balance associated with the second funds amount to be established at the second electronic gaming device.

13. The method of claim 12, further comprising determining a responsible gaming limit comprising a threshold amount of funds.

14. The method of claim 13, further comprising:
comparing the second funds amount to the threshold amount of funds; and
in response to determining that the funds amount is less than the threshold amount of funds, causing the second funds amount to be transferred from the external player account and deposited at the second electronic gaming device.

15. A non-transitory computer-readable medium comprising instructions stored thereon that, in response to execution by a processor, cause the processor to:
receive, by a messaging application programming interface (API) and from a server, a first funds transfer message based on a player initiating a funds transfer request at an electronic gaming device of a plurality of electronic gaming devices, wherein the first funds transfer message is associated with a credit balance of an amount of credits usable by the player to play an electronic game at the electronic gaming device, and wherein the messaging API is configured to receive funds transfer messages in a first message format and from the server that manages electronic gaming sessions at the plurality of electronic gaming devices;

convert, by the messaging API, the first funds transfer message from the first message format to a second message format;

transmit the first funds transfer message to a digital wallet server configured to manage funds transfers; and in response to the first funds transfer message being transmitted to the digital wallet server, automatically cause a funds amount associated with the credit balance to be deposited in an external player account of the player at an external provider server.

16. The non-transitory computer-readable medium of claim 15, wherein the instructions further cause the processor to:

determine, in response to the first funds transfer message being transmitted to the digital wallet server, that the player has stopped playing at the electronic gaming device;

determine a remaining credit balance comprising the amount of credits, the remaining credit balance comprising the funds amount;

cause the funds to be deposited into a player account of the player associated with an operator of the electronic gaming device; and in response to the funds amount being deposited into the player account of the player, automatically withdraw the funds amount from the player account and cause the funds amount to be deposited in the external player account of the player.

17. The non-transitory computer-readable medium of claim 15, wherein the instructions further cause the processor to:

determine that the player has left a gaming property associated with the plurality of electronic gaming devices; and in response to determining that the player has left the gaming property associated with the plurality of electronic gaming devices, transmit, to the server, a request for the first funds transfer message.

18. The non-transitory computer-readable medium of claim 15, wherein the instructions further cause the processor to:

receive, by the messaging API from a second server that manages electronic gaming sessions at a second plurality of electronic gaming devices, a second funds transfer message in response to the player initiating a second funds transfer request a second electronic gaming device of the second plurality of electronic gaming devices, the second funds transfer request identifying a second funds amount and the external player account of the player; and cause the second funds amount to be transferred from the external player account and deposited at the second electronic gaming device, causing a credit balance associated with the second funds amount to be established at the second electronic gaming device.

19. The non-transitory computer-readable medium of claim 18, wherein the instructions further cause the processor to determine a responsible gaming limit comprising a threshold amount of funds.

20. The non-transitory computer-readable medium of claim 19, wherein the instructions further cause the processor to:

compare the second funds amount to the threshold amount of funds; and in response to determining that the funds amount is less than the threshold amount of funds, cause the second funds amount to be transferred from the external player account and deposited at the second electronic gaming device.

* * * * *